(12) United States Patent
Shimizu et al.

(10) Patent No.: US 12,111,418 B2
(45) Date of Patent: Oct. 8, 2024

(54) RADAR APPARATUS

(71) Applicant: DENSO CORPORATION, Kariya (JP)

(72) Inventors: Naotsugu Shimizu, Kariya (JP); Seiya Fujitsu, Kariya (JP)

(73) Assignee: DENSO CORPORATION, Kariya (JP)

( * ) Notice: Subject to any disclaimer, the term of this patent is extended or adjusted under 35 U.S.C. 154(b) by 409 days.

(21) Appl. No.: 17/496,289

(22) Filed: Oct. 7, 2021

(65) Prior Publication Data

US 2022/0026525 A1   Jan. 27, 2022

Related U.S. Application Data

(63) Continuation of application No. PCT/JP2020/016033, filed on Apr. 9, 2020.

(30) Foreign Application Priority Data

Apr. 10, 2019   (JP) .................... 2019-074876

(51) Int. Cl.
*G01S 7/35* (2006.01)
*G01S 13/42* (2006.01)
*G01S 13/58* (2006.01)
*G01S 13/931* (2020.01)

(52) U.S. Cl.
CPC .............. *G01S 7/356* (2021.05); *G01S 13/42* (2013.01); *G01S 13/584* (2013.01); *G01S 13/931* (2013.01)

(58) Field of Classification Search
CPC ........ G01S 13/931; G01S 13/345; G01S 7/41; G01S 7/411; G01S 7/414; G01S 7/415; G01S 7/356; G01S 7/023; G01S 2013/932

USPC ................ 342/192, 196, 189, 195, 145, 70
See application file for complete search history.

(56) References Cited

U.S. PATENT DOCUMENTS

| | | | | |
|---|---|---|---|---|
| 8,427,361 | B2* | 4/2013 | Sato | G01S 13/345 |
| | | | | 342/107 |
| 8,488,110 | B2* | 7/2013 | Hug | G01S 17/10 |
| | | | | 702/158 |
| 8,686,893 | B2* | 4/2014 | Watanabe | G01S 13/34 |
| | | | | 342/108 |
| 9,129,531 | B2* | 9/2015 | Hayashi | G01S 7/02 |
| 9,424,750 | B2* | 8/2016 | Hayashi | G01S 13/06 |
| 9,652,986 | B2* | 5/2017 | Belzner | G08G 1/14 |
| 10,832,093 | B1* | 11/2020 | Taralova | G06F 18/217 |

(Continued)

FOREIGN PATENT DOCUMENTS

JP   2016206011 A   12/2016

*Primary Examiner* — Vladimir Magloire
*Assistant Examiner* — Michael W Justice
(74) *Attorney, Agent, or Firm* — MASCHOFF BRENNAN

(57) ABSTRACT

A feature quantity calculation unit calculates one or more predetermined types of feature quantities using information correlated to respective extracted peaks. An environment determination unit calculates a specific environment probability from a calculation result of the feature quantity calculation unit using the positive distribution and a non-specific environment probability from a calculation result of the feature quantity calculation unit using the negative distribution. The environment determination unit further determines whether the mobile body is in the specific environment or the non-specific environment in accordance with a result of integration of the specific environment probability and the non-specific environment probability which are calculated for respective feature quantities.

15 Claims, 16 Drawing Sheets

(56) References Cited

U.S. PATENT DOCUMENTS

| | | | |
|---|---|---|---|
| 11,585,895 B2* | 2/2023 | Schmid | G01S 7/411 |
| 11,656,342 B2* | 5/2023 | Kulesh | G01S 17/18 |
| | | | 356/5.01 |
| 2011/0098970 A1* | 4/2011 | Hug | G01F 23/292 |
| | | | 702/158 |
| 2012/0056773 A1* | 3/2012 | Sato | G01S 7/354 |
| | | | 342/109 |
| 2012/0127016 A1* | 5/2012 | Watanabe | G01S 13/34 |
| | | | 342/146 |
| 2013/0018575 A1* | 1/2013 | Birken | G01S 13/00 |
| | | | 701/514 |
| 2014/0340242 A1* | 11/2014 | Belzner | G08G 1/147 |
| | | | 340/932.2 |
| 2014/0350838 A1* | 11/2014 | Hayashi | G01S 13/931 |
| | | | 701/301 |
| 2015/0247922 A1* | 9/2015 | Hayashi | G01S 7/02 |
| | | | 342/146 |
| 2020/0233066 A1* | 7/2020 | Kulesh | G01S 17/04 |
| 2020/0393541 A1* | 12/2020 | Schmid | G01S 7/414 |

* cited by examiner

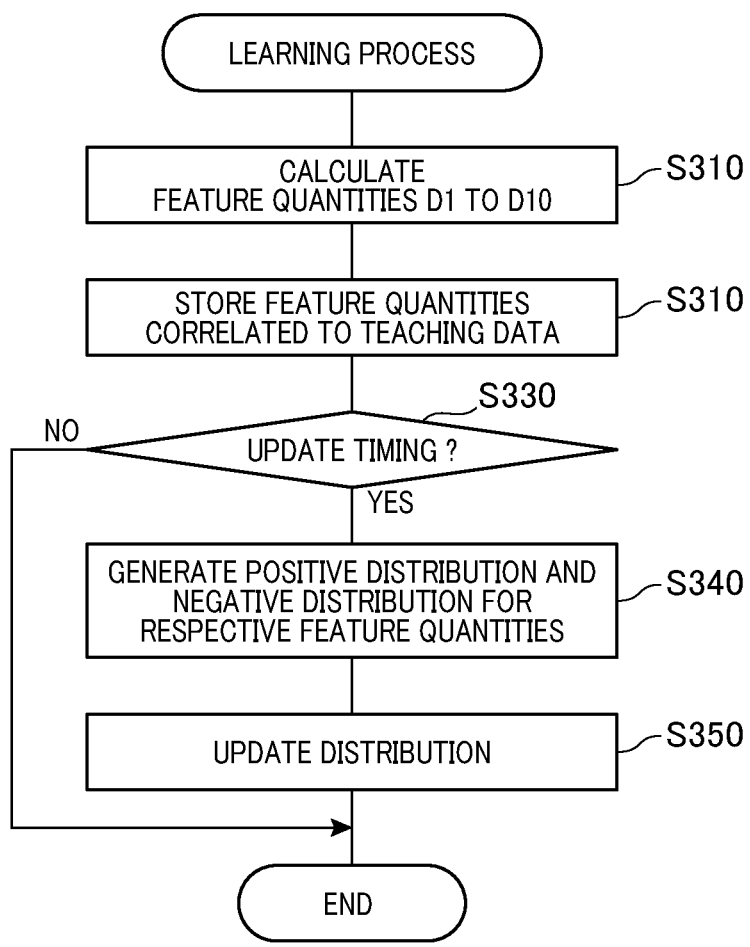

RADAR APPARATUS

This application is the U.S. bypass application of International Application No. PCT/JP2020/16033 filed on Apr. 9, 2020, which designated the U.S. and claims priority to Japanese Patent Application No. 2019-074876, filed Apr. 10, 2019, the contents of both of these are incorporated herein by reference.

BACKGROUND

Technical Field

The present disclosure relates to a radar apparatus mounted on a mobile body.

Description of the Related Art

A radar apparatus mounted on a mobile body, when used in an environment where number of reflection points are detected such as a tunnel, a multistory parking space, erroneous detections of objects are likely to occur.

For example, a technique is disclosed, which is applied to a radar apparatus for suppressing erroneous detections by determining whether the own vehicle is in a specific environment due to fluctuation of the number of peak detections in which erroneous detections are likely to occur, and setting the threshold for extracting detected peaks when determined that the own vehicle is in the specific environment.

SUMMARY

One aspect of the present disclosure is a radar apparatus mounted to a mobile body and provided with a spectrum generation unit, a peak extracting unit, a feature quantity calculation unit, a distribution storing unit and an environment determination unit.

The spectrum generation unit uses one or more modulation systems, analyzes a signal acquired by transmitting and receiving modulation waves of respective modulation systems as radar waves The peak extracting unit extracts a peak from the at least one of an one-dimensional spectrum and a two dimensional spectrum. The feature quantity calculation unit calculates one or more predetermined types of feature quantities using information correlated to respective peaks. In the distribution storing unit, a positive distribution and a negative distribution generated in advance for respective feature quantities are stored. The environment determination unit calculates a specific environment probability from a calculation result of the feature quantity calculation unit using the positive distribution and a non-specific environment probability, and determines whether the mobile body is in the specific environment or the non-specific environment

BRIEF DESCRIPTION OF THE DRAWINGS

FIG. 17 is a flowchart showing a learning process.

DETAILED DESCRIPTION OF PREFERRED EMBODIMENTS

Figure 1:
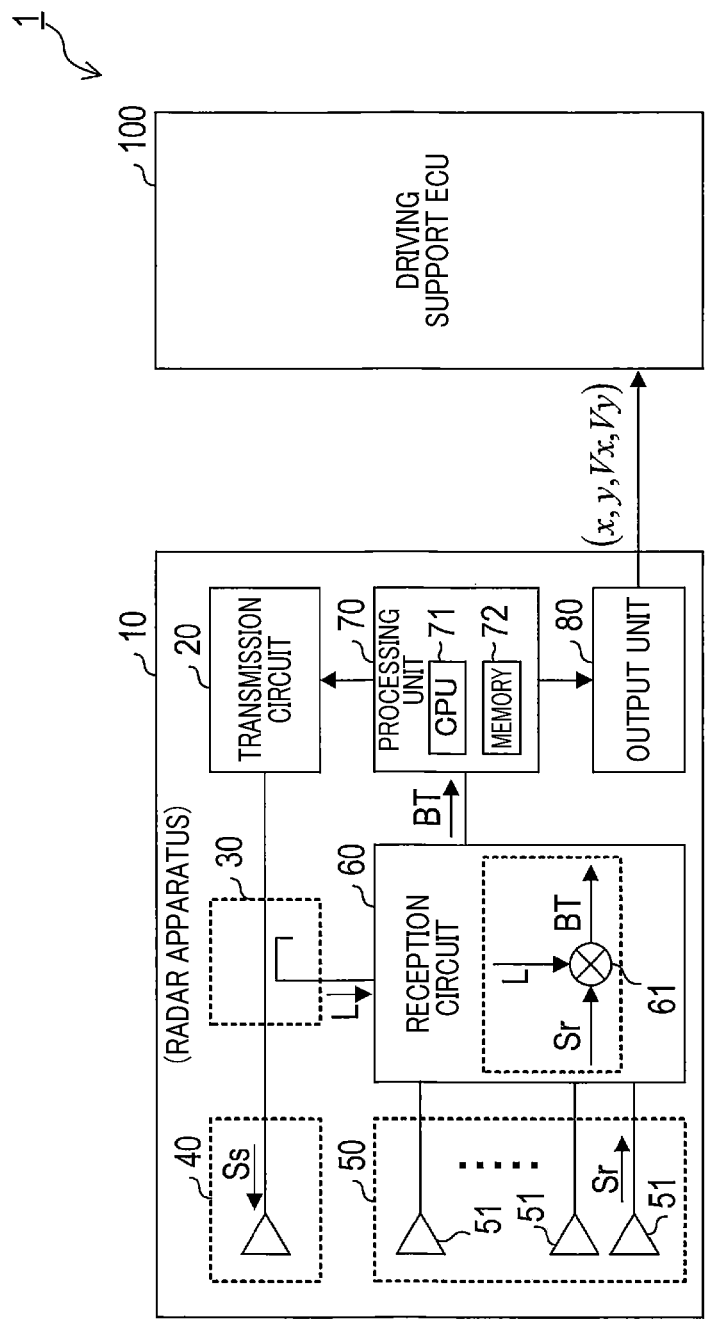
FIG. 1 is a block diagram showing a configuration of an on-vehicle system.

A radar apparatus mounted on a mobile body, when used in an environment where number of reflection points are detected such as a tunnel, a multistory parking space, erroneous detections of objects are likely to occur.

For example, JP 2016-206011 A discloses a technique applied to a radar apparatus for suppressing erroneous detections by determining whether the own vehicle is in a specific environment due to fluctuation of the number of peak detections in which erroneous detections are likely to occur, and setting the threshold for extracting detected peaks when determined that the own vehicle is in the specific environment.

In this respect, as a result of keen research by the inventor and the like, the following problems are found.

In the specific environment surrounded by walls of the tunnel or the like, since the number of reflected points is increased and also electromagnetic waves are prevented from being diffused, objects existing in the distance are detected at reflected power relatively larger than that outside the specific environment. In particular, according to a method in 2-frequency CW or FMCW for calculating the distance using a phase difference of the signals, that is, phase of a differential signal, the calculated distance includes ambiguity due to phase folding. Specifically, a distance with one rotation of the phase of signal is the upper limit distance to be detected, and an object existing at a location farther than the upper limit distance may be erroneously detected due to phase folding. Such a ghost cannot be eliminated by only changing the threshold used for the peak detection, and therefore a ghost elimination process which is a specific process for eliminating the ghost is required to be performed. Since the ghost elimination process requires avoiding unnecessarily removing detected objects and increases processing load in the radar apparatus, the ghost elimination process may preferably be executed only when necessary.

Hereinafter, with reference to the drawings, embodiments of the present disclosure will be described.

0. Specific Environment

Firstly, specific environment addressed in the present disclosure will be described.

In a straight-shaped tunnel, since the reflections from the ceiling or the road side object are positioned in a line behind the own vehicle, the azimuth of the ceiling or the road side objects detected by the radar apparatus matches with the detected azimuth of the approaching vehicle in the tunnel. Further, since electromagnetic waves are not diffused in a tunnel, the reflected power of an object existing in the distance is detected at greater power compared to that outside the tunnel. Hence, according to the modulation system using phase of electromagnetic waves for calculating the distance (i.e. having ambiguity in the distance calculation), an object existing in the distance farther than the detection distance corresponding to one phase rotation is detected as being within the detection distance, and so called ghosts occur. Hereinafter, such a ghost is referred to as far distance ghost.

Then, in the case where a radar apparatus utilizes a plurality of modulation systems such that peak information or the like detected in the respective modulation systems are compared so as to detect the object, the radar apparatus possibly detects a far distance ghost detected with one modulation system and reflection waves from the ceiling at a short distance detected with other modulation system with similar distance and azimuth, and erroneously recognizes that these reflection points are based on the same object. Then, the radar apparatus erroneously determines that an object is present within the short-distance range, and may cause a false alert or the like. According to the present disclosure, at least such a situation, that is, an environment in which the far distance ghost may erroneously be detected as a short-distance object is referred to as a specific environment. However, the specific environment capable of being addressed in the present disclosure is not limited to this specific environment.

1. First Embodiment

[1.1. Configuration]

An on-vehicle system 1 is provided with a radar apparatus 10 and a driving support ECU 100. The ECU is an abbreviation of Electronic Control Unit. The on-vehicle system 1 is mounted on a vehicle such as a four-wheel vehicle as a mobile body. The radar apparatus 10 is mounted to, for example, a rear part of the vehicle at each of the left and right side portions and disposed such that a detection range of the radar apparatus 10 includes a back side area along the linear advancing direction of the vehicle and a lateral area orthogonal to the linear advancing direction. A vehicle to which the radar apparatus 10 is mounted is referred to as an own vehicle.

The radar apparatus 10 emits radar waves, receives the reflected waves thereof and detects, based on the reception signal Sr, a distance R to an object that reflected the radar waves, the velocity V of the object and an azimuth θ of the object. The radar apparatus 10 calculates estimated values of a lateral position x, a vertical position y, a lateral velocity Vx, a vertical velocity Vy from these detection values (R, V, θ), and outputs these estimated values (x, y, $V_x$, $V_y$) to the driving support ECU 100. Note that the lateral position x refers to a position along the vehicle width direction of the vehicle to which the on-vehicle system 1 is mounted, and the vertical position y refers to a position along the travelling direction of the vehicle.

The driving support ECU 100 executes various processes for supporting vehicle driving by the driver, based on the estimated values (x, y, $V_x$, $V_y$) of respective objects. The processes of the driving support may include a process for alerting the driver that an approaching object is present, or a process for avoiding a collision by controlling the braking system, the steering system and the like, and a vehicle control process for automatically changing the lane.

The radar apparatus 10 is provided with a transmission circuit 20, a distributer 30, a transmission antenna 40, a reception antenna 50, a reception circuit 60, a processing unit 70 and an output unit 80.

Figure 2:
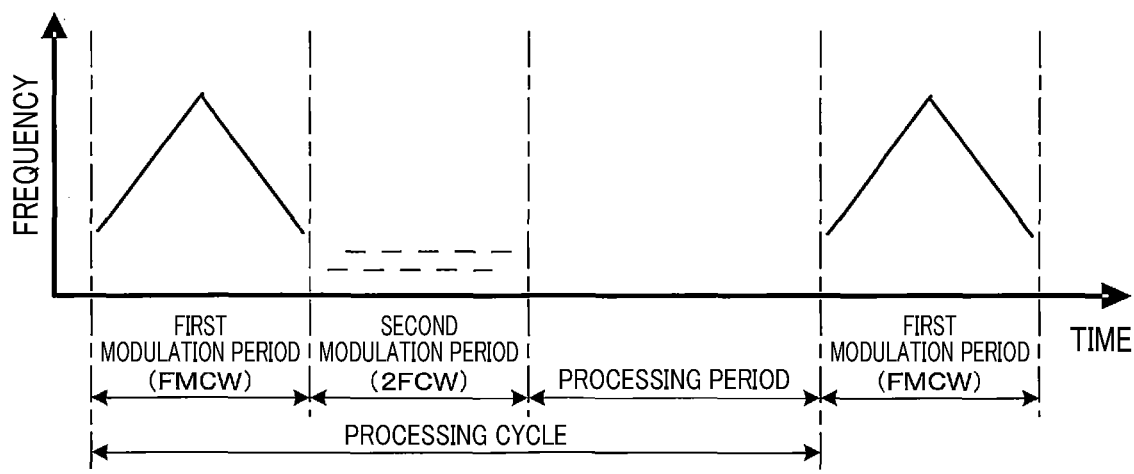
FIG. 2 is an explanatory diagram showing a modulation system of radar waves to be used.

The transmission circuit 20 is configured to supply a transmission signal Ss to the transmission antenna 40. The transmission circuit 20 outputs a millimeter waveband high frequency signal to the distributer 30 positioned at upper stream side of the transmission antenna 40. Specifically, as shown in FIG. 2, the transmission circuit 20 alternately repeats a first modulation period and a second modulation period at predetermined processing cycles, and outputs a high frequency signal generated in each modulation period to the distributer 30. In the first modulation period, the transmission circuit generates the high frequency signal which is frequency-modulated such that the frequency is increased and decreased in a triangular wave shape. In the second modulation period, the transmission circuit generates the high frequency signal in which the frequency is alternately changed. The processing cycle is set to be longer than the total period of the first modulation period and the second modulation period. A period from when the second modulation period is completed to when the first modulation period in the next processing cycle is started is referred to as a processing period.

In other words, the radar apparatus 10 operates as a FMCW radar in the first modulation period in which FMCW waves are transmitted and received, and operates as 2 FCW radar in the second modulation period in which 2 frequency CW (hereinafter referred to as 2FCW) are transmitted as the second modulation waves. Note that the two frequencies used in the 2FCW are set to be capable of uniquely measuring the distance in a range of a predetermined upper limit distance (e.g. 150 m). Note that two signal having different frequencies used in the 2FCW are hereinafter referred to as first signal and second signal. The waveforms of the FMCW are set to be capable of uniquely determining the distance in a distance range which is different from the above-described predetermined upper limit distance. Note that the upper limit distance with the first modulation and the upper limit distance may be the same.

Referring back to FIG. 1, the distributer 30 distributes, as a power distribution, the high frequency signal from the transmission circuit 20 into the transmission signal Ss and a local signal L.

The transmission antenna 40 emits radar waves corresponding to the transmission signal Ss based on the transmission signal Ss supplied from the distributer 30.

The reception antenna 50 receives reflected waves reflected at an object. The reception antenna 50 is configured as a linear array antenna in which a plurality of antenna elements 51 are arranged in a row. The reception signals Sr of the reflected waves by the respective antenna elements 51 are outputted to the reception circuit 60.

The reception circuit 60 processes the reception signals Sr received from the respective antenna elements 51 constituting the reception antenna 50 and generates beat signals BT for respective antenna elements 51 and outputs them. Specifically, the reception circuit 60 uses a mixer 61 to mix the reception signals Sr from the antenna elements 51 with a local signal L from the distributer 30 for respective antenna elements 51, thereby generating the beat signals BT for respective antenna elements 51 and outputting them.

However, a process before outputting the beat signal BT includes a process for amplifying the reception signal Sr, a process for removing unnecessary signals from the beat signal BT and a process for converting the beat signal BT into digital data. Thus, the reception signal 60 converts the generated beat signals BT for respective antenna elements 51 into digital data and outputs them. The outputted beat signals BT for respective antenna elements 51 are outputted to the processing unit 70. Hereinafter, the A/D conversion data of the beat signals BT acquired in the first period is referred to as a first modulation data, and the A/D conversion data of the beat signals BT acquired in the second period is referred to as a second modulation data.

The processing unit 70 is provided with a microcomputer including a CPU 71, semiconductor memory unit such as RAM and ROM (hereinafter referred to as memory 72). Also, the processing unit 70 may be provided with a coprocessor that executes a fast Fourier transform process (hereinafter referred to as FFT).

The processing unit 70 executes at least an object detecting process. The object detecting process analyzes the beat signals for respective antenna elements 51, thereby calculating estimated values (x, y, $V_x$, $V_y$) for respective objects that reflect the radar waves.

[1-2. Process]

[1-2-1. Object Detecting Process]

Figure 3:
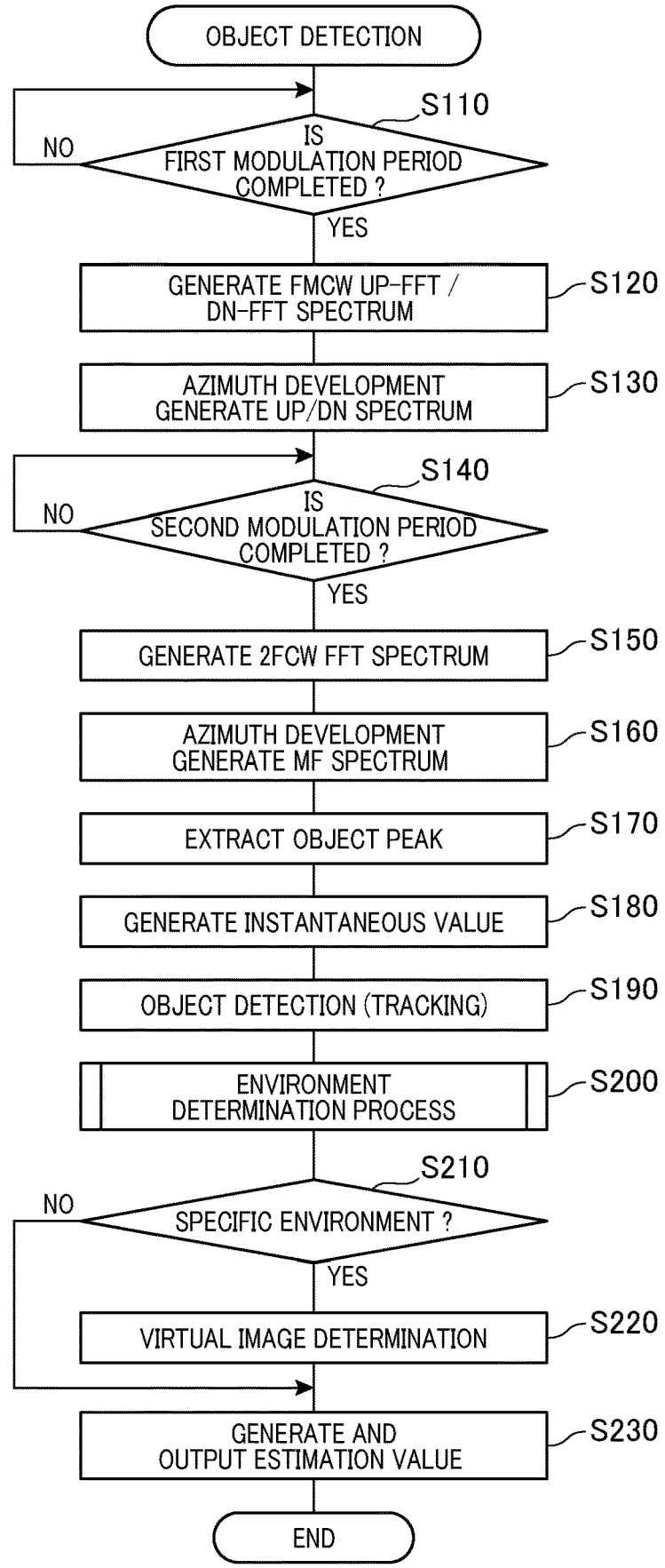
FIG. 3 is a flowchart of an object detecting process.

An object detecting process executed by the processing unit 70 will be described with reference to FIG. 3.

The present process is repeatedly executed at each processing cycle once the on-vehicle system 1 is activated.

When the process is activated, the processing unit 70 determines, at step S110, whether the first modulation period is completed, that is, whether acquisition of the first modulation data is completed. When the acquisition of the first modulation data is not completed, the processing unit 70 waits by repeating this step, and proceeds to step S120 when the acquisition of the first modulation data is completed.

At step S120, the processing unit 70 executes a frequency analysis process of the first modulation data for respective antenna elements 51 at a up chirp and a down chirp periods, thereby calculating the power spectrum.

In this step, as a frequency analysis process, a FFT process is executed. FFT is an abbreviation of Fast Fourier Transform. A power spectrum acquired by FFT is referred to as FFT spectrum. In the FFT spectrum, the power of the reflected waves are indicated for each frequency bin. The frequency bin indicates each unit of the FFT spectrum in the frequency range, and is determined by the number of samples of data as an object of the FFT process and the sampling frequency.

Note that the up chirp refers to a signal in the FMCW process of which the frequency increases with time, and the down chirp refers to a signal in the FMCW process of which the frequency decreases with time. Hereinafter, the FFT spectrum in the up chirp period is referred to as UP-FFT spectrum and the down chirp period is referred to as DN-FFT spectrum. These UP-FFT spectrum and DN-FFT spectrum correspond to a one-dimensional spectrum.

The processing unit 70 calculates, for the UP-FFT spectrum and the DN-FFT spectrum, an average FFT spectrum in which the FFT spectrum is acquired by the respective antenna elements 51. Further, the processing unit 70 extracts a frequency bin where a peak in the average FFT spectrum has a signal level larger than or equal to a predetermined threshold.

Next at step S130, the processing unit 70 executes an azimuth calculation for UP-FFT spectrum and the DN-FFT spectrum which are calculated at step S120.

In the azimuth calculation, an azimuth development is performed based on that the phases of peaks detected at the same frequency bin in the respective channels are different. According to this azimuth calculation, a two-dimensional spectrum is generated where the coordinate axes are the frequency bin and the azimuth. A high-resolution algorithm such as MUSIC may be utilized for the azimuth calculation. Note that MUSIC is an abbreviation of Multiple Signal Classification. The azimuth calculation is not limited thereto, but beam forming or the like may be used. Further, the azimuth calculation is executed at least for all frequency bins where the peaks are detected on the FFT spectrum at step S120. Hereinafter, the two-dimensional spectrum of the up chirp is referred to as UP spectrum and the two-dimensional spectrum of the down chirp is referred to as DN spectrum.

Next at step S140, the processing unit 70 determines whether the second modulation period is completed, that is, whether acquisition of the modulation data is completed. The processing unit 70 waits by repeating this step, and proceeds to step S150 when the acquisition of the first modulation data is completed.

At step S150, the processing unit 70 executes a frequency analysis process of the second modulation data for the respective antenna elements 51, the first signal and the second signal, thereby calculating the power spectrum and detecting peaks on the power spectrum. In this step, similar to step S120, a FFT process is executed as a frequency analysis process. A FFT spectrum acquired as a result of the FFT process corresponds to one-dimensional spectrum.

Figure 4:
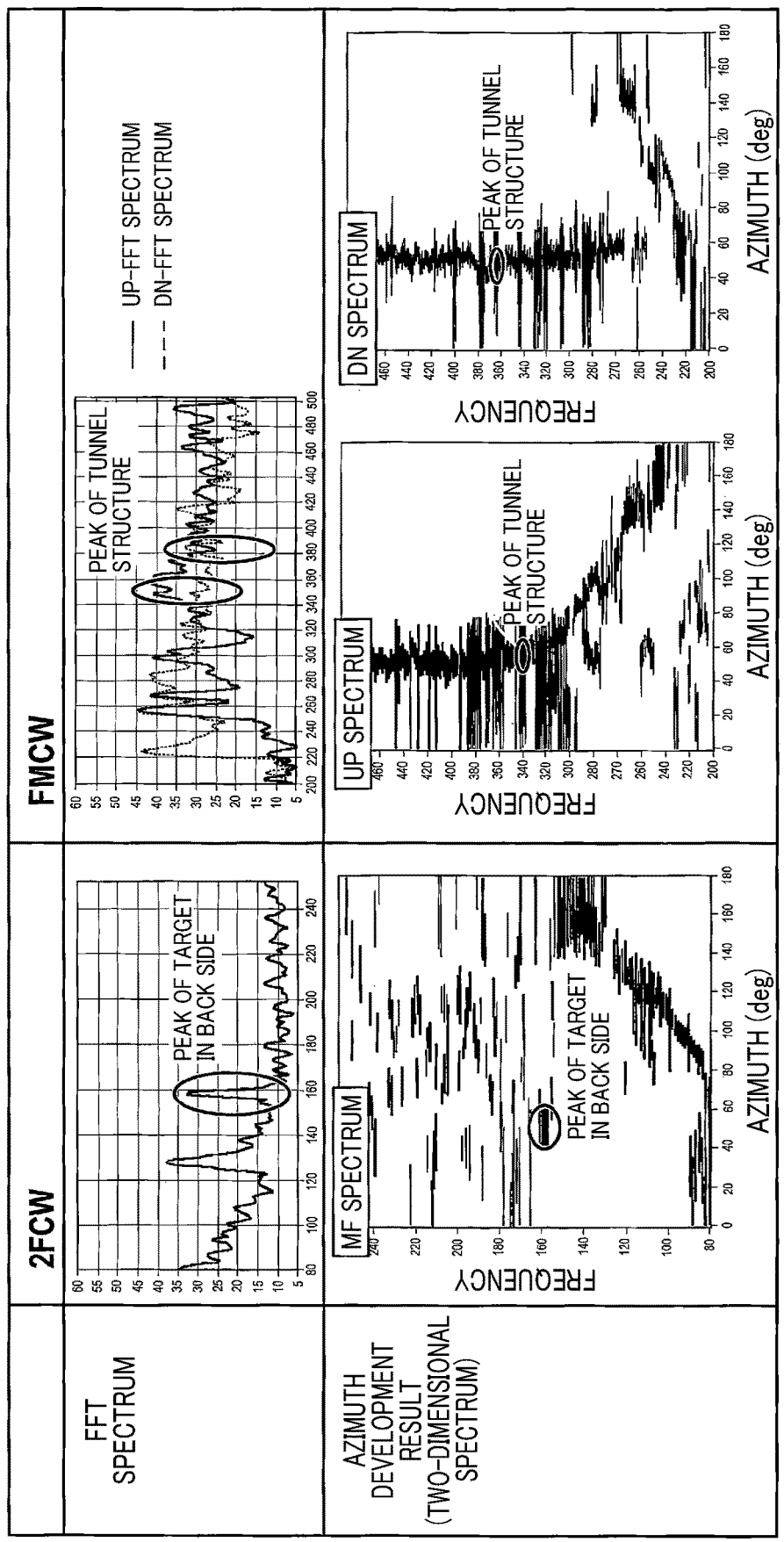
FIG. 4 is an explanatory diagram exemplifying a FFT spectrum and an azimuth-developed two-dimensional spectrum generated in an object detecting process.

Since the frequencies of the first signal and the second signal in 2FCW are sufficiently close to each other, the Doppler frequency detected from the first signal and the Doppler frequency detected from the second signal are substantially the same. In other words, according to the FFT spectrum of the first signal and the FFT spectrum of the second signal, peaks are detected at the same frequency bin. As a result, since the FFT spectrum of the first signal and the FFT spectrum of the second signal have the same shape, FIG. 4 shows only one FFT spectrum.

Then, an average FFT spectrum, where the FFT spectrums acquired for respective antenna elements 51 are averaged, is calculated for the first signal and the second signal, and a frequency bin having a peak larger than or equal to a threshold in which the power is set in advance is extracted.

Further, the distance is calculated in accordance with a phase difference $\Delta\theta$ between two frequency components detected at the same frequency bin from two averaged FFT spectrum. Since it cannot be distinguished whether the actual phase difference is $\Delta\theta$ or $2\pi n+\Delta\theta$, the distance calculated from the phase difference $\Delta\theta$ includes ambiguity. Note that n is an integer number.

Next at step S160, the processing unit 70 uses either one FFT spectrum (hereinafter referred to as MF-FFT spectrum) of the first signal or the second signal, and executes the azimuth calculation similar to the process at step S130. The two-dimensional spectrum generated by this azimuth calculation is referred to as MF spectrum. The azimuth calculation is executed for all of the frequency bins where peaks are detected on the MF-FFT spectrum at step S150.

Next at step S170, the processing unit 70 extracts, based on the UP spectrum and the DN spectrum generated at step S130, and the MF spectrum generated at step S160, all peaks having a power larger than or equal to the predetermined threshold to be the object peaks.

Next at step S180, the processing unit 70 performs peak matching that correlates, among object peaks extracted at step S170, peaks which are predicted to be based on the same object, thereby generating an instantaneous value in this cycle.

Specifically, the process sets, based on the azimuth, the distance and the relative speed which are identified from the object peak on the MF spectrum, the estimated range of the frequency bin in which the object peaks appear in the UP spectrum and the DN spectrum, and extracts peaks existing in the estimated range.

As shown in FIG. 4, the estimated range is set to be the same azimuth as the object peak, and the range of the frequency bin is variably set depending on the distance and the relative speed. Specifically, in the case where the reflected point corresponding to the object peak is approaching the own vehicle, the range of the frequency bin for the UP spectrum is set to be lower than that of the DN spectrum. In the case where the reflected point corresponding to the object peak is being separated from the own vehicle, the range of the frequency bin in the UP spectrum is set to be larger than that of the DN spectrum. This is based on the characteristics of the FMCW radar in which a magnitude correlation between the frequency detected in the up chirp due to Doppler shift and the frequency detected in the down chirp due to Doppler shift are changed. However, in the case where the relative speed between the reflected point corresponding to the object peak and the own vehicle is zero, peaks of 2FCW cannot be detected due to low frequency noise. Hence, matching with the FMCW peak cannot be accomplished. In this case, the matching process is performed only in the FMCW, that is, matching is performed between the peak in the UP spectrum and the peak in the DN spectrum.

Hereinafter, the peak on the XX spectrum is referred to as XX peak. However, XX indicates any one of MF-FFT, UP-FFT, DN-FFT, MF, UP and DN.

The instantaneous value when both of the UP peak and the DN peak corresponding to the MF peak are extracted is referred to as (MF, UP, DN). The instantaneous value when only the UP peak corresponding to the MF peak is extracted is referred to as (MF, UP). The instantaneous value when only the DN peak corresponding to the MF peak is extracted is referred to as (MF, DN).

Further, the instantaneous value extracted when using a known FMCW radar method with the UP peak and the DN peak without using the MF peak is referred to as (UP, DN).

Next at step S190, the processing unit 70 executes a tracking process using the instantaneous value generated at step S180, thereby detecting an object. The tracking process calculates the distance and azimuth where the object and the like are estimated to be detected in the current cycle (hereinafter referred to as estimated position) based on the object detected in the previous cycle and an object candidate (hereinafter referred to as objects and the like). Moreover, the process calculates, based on the instantaneous value, a distance and an azimuth (hereinafter referred to as detected position) of the reflected point (hereinafter referred to as peak corresponding point) indicated by the instantaneous value. Then, in the case where the difference between the estimated position and the detection position is within a predetermined allowable range, the process correlates the object and the like with the instantaneous value and executes a history connection. When no objects are present to be correlated with, the process assumes that the instantaneous value has no newly detected history connection, and determines the instantaneous value to be the formal object. Further, the object candidate is determined as a formal object when the history connection is continuously detected for a predetermined number of processing cycles.

Subsequently, at step S200, the processing unit 70 executes an environment determination process that determines whether the situation around the own vehicle is in a specific environment. The environment determination process will be detailed later.

At step S210, the processing unit 70 proceeds to step S220 when determined that it is in the specific environment as a result of the environment determination process and proceeds to step S230 when determined that it is not in the specific environment.

At step S220, the processing unit 70 determines, for each object, whether the object is a virtual image or not, sets a virtual image flag in accordance with the determination result, and proceeds to step S230. For the determination whether an object is a virtual image not, for example, one or more feature quantity may be extracted from the information correlated to an object or the like and the instantaneous value having the history connection with the object or the like, and may determine stochastically whether an object is a virtual image or not by using a process similar to the environment determination process.

At step S240, the processing unit 70 generates the estimated values (x, y, $V_x$, $V_y$) related to the object detected at step S190, outputs the estimated values (x, y, $V_x$, $V_y$) to the driving support ECU 100, and terminates the process. The estimated value may include a virtual image flag F.

In the driving support ECU 100, when the estimated value includes a virtual flag F, for example, the virtual image flag F may be used as an alert ON-OFF information, and the estimated values in which the virtual image flag F (i.e. object) is set may be excluded from objects for which the alert, a brake system and a steering system are controlled. Note that the virtual image flag F may be used for various other controls.

In the object detecting process, the processes at steps S110 to S160 correspond to spectrum generating unit, and a process at step S170 corresponds to a peak extracting unit.

[1-2-2. Feature Quantity/Positive Distribution/Negative Distribution]

Before describing the environment determination process executed by the processing unit 70 at step S200, a feature quantity, a positive distribution, a negative distribution, a positive probability, a negative probability will be described.

The feature quantity is information extracted from the MF spectrum, the UP spectrum and the DN spectrum, and information extracted from the MF-FFT spectrum, the UP-FFT spectrum and the DN-FFT spectrum which are acquired in a process of generating the above-mentioned spectrums. Further, information obtained by combining and calculating the above information may be used. Here, 10 feature quantities will be descried. Note that 10 feature quantities are referred to as first to tenth feature quantity D1 to D10.

Figure 5:
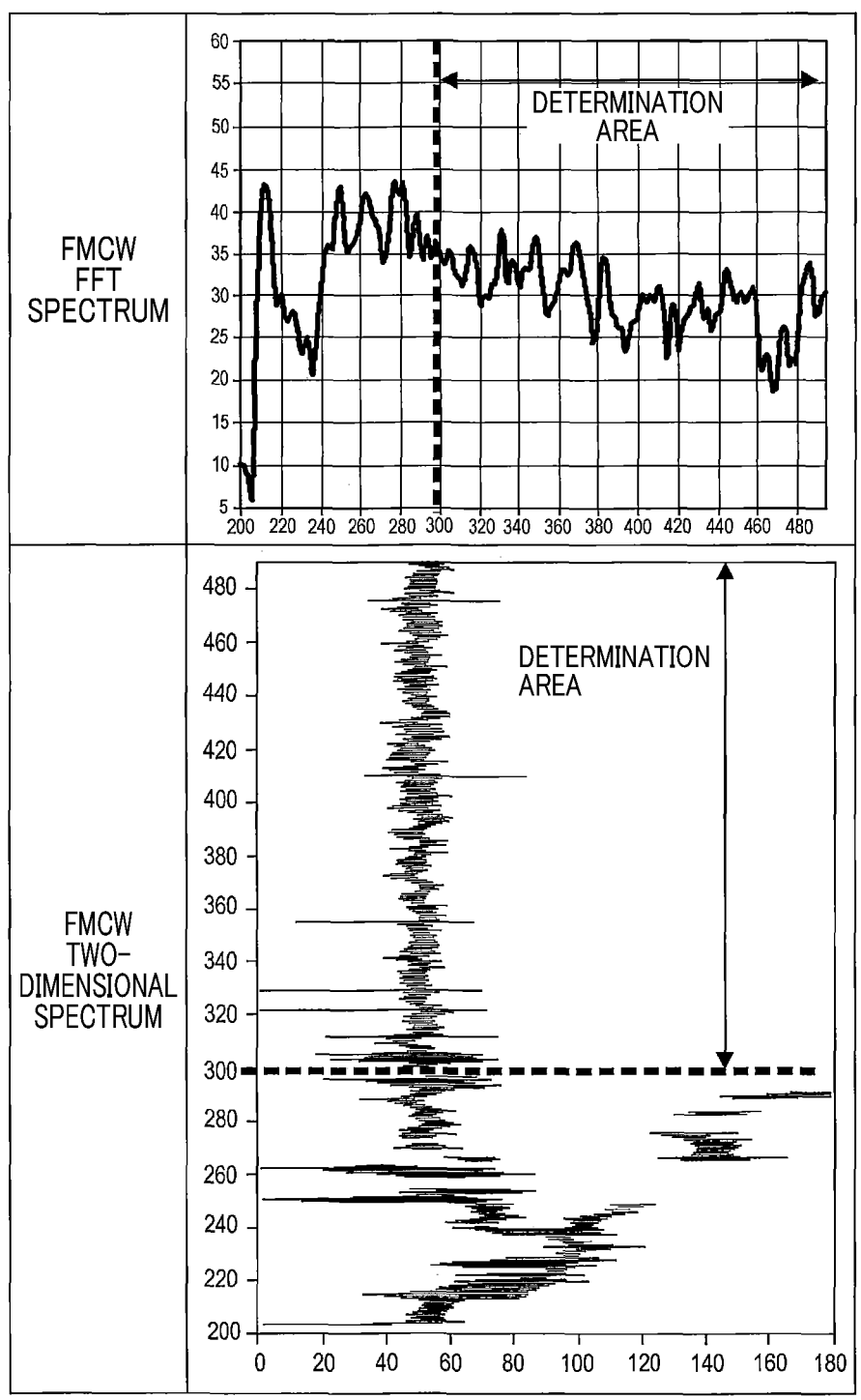
FIG. 5 is an explanatory diagram exemplifying a determination area of the FFT spectrum and the two-dimensional spectrum.
Figure 6:
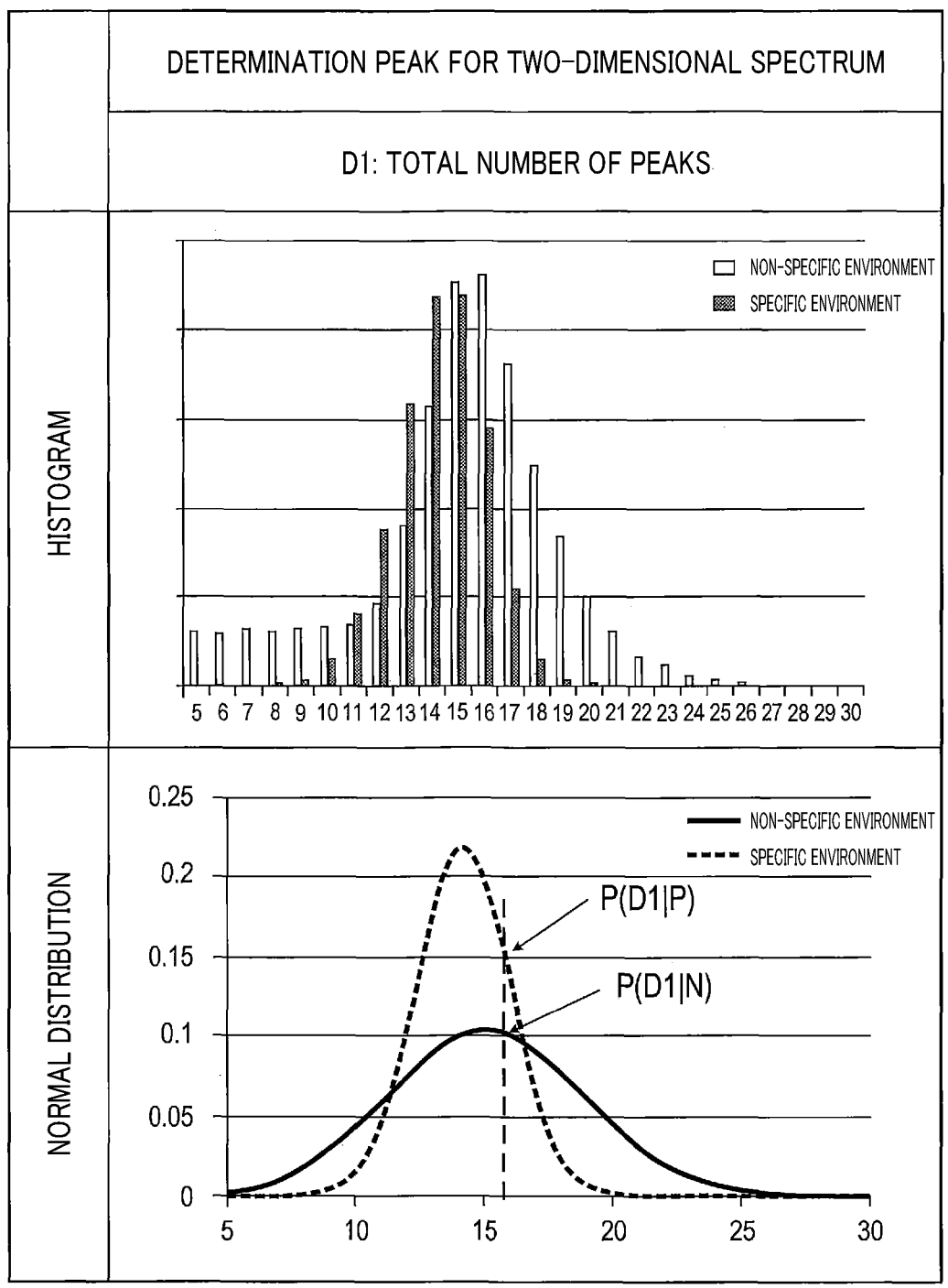
FIG. 6 is a diagram showing a histogram and a normal distribution of a first feature quantity.
Figure 7:
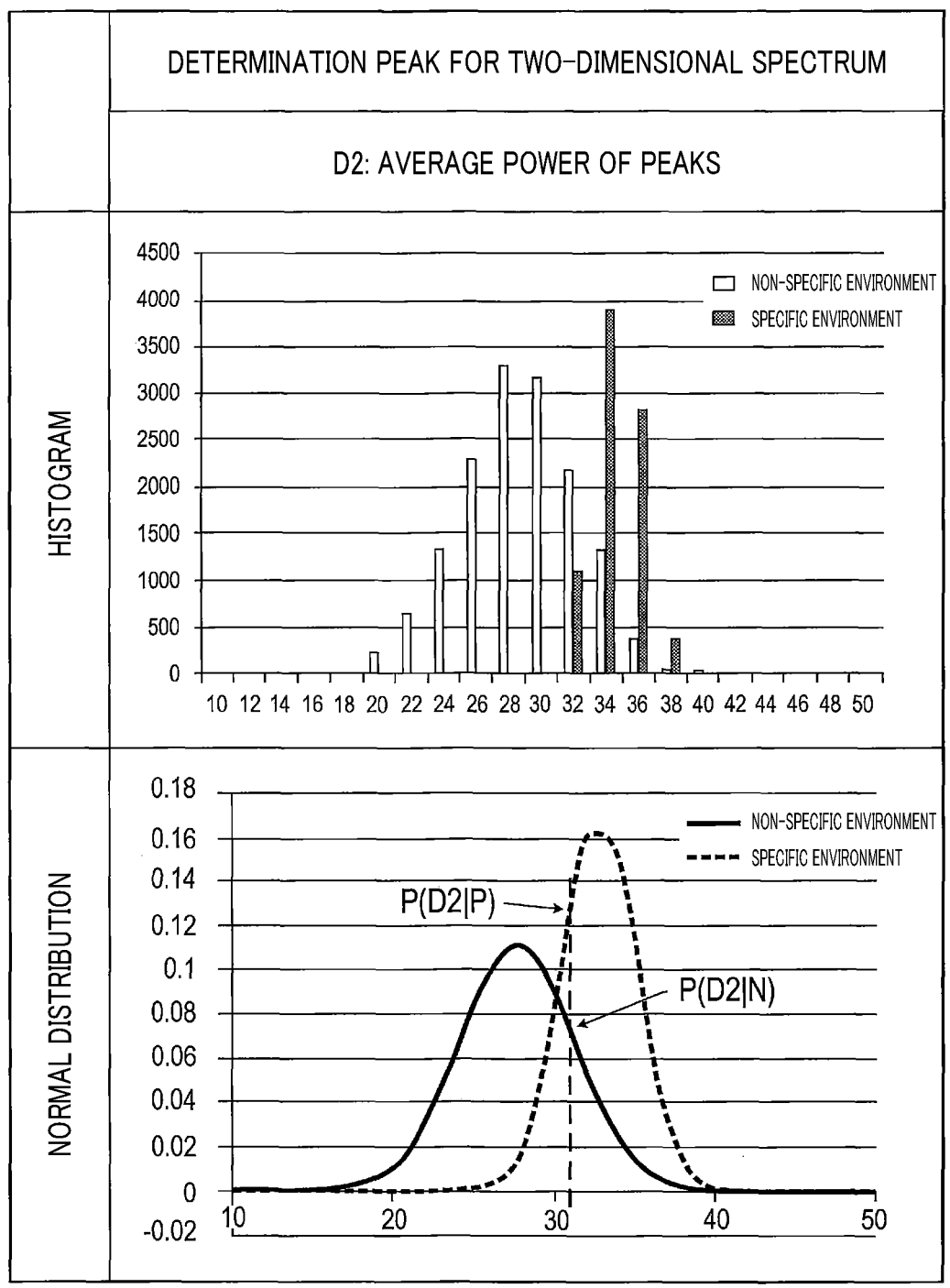
FIG. 7 is a diagram showing a histogram and a normal distribution of a second feature quantity.

As shown in FIG. 5, in the FFT spectrum and the two-dimensional spectrum, a region larger than or equal to a predetermined frequency threshold is referred to as a determination area. The frequency threshold is set depending on the travelling speed of the own vehicle, that is, a mobile speed of a mobile body to which the radar apparatus 10 is mounted. This is because, since the stationary object has a relative speed corresponding to the travelling speed of the own vehicle, the frequency range to be a determination area depending on the relative speed is offset in the FMCW spectrum. In the case where the own vehicle travels forward and the stationary object is detected at a back side with respect to the position where the radar apparatus 10 is mounted, the stationary object has a positive relative speed. Also, in the case where the stationary object is detected at a front side with respect to the position where the radar apparatus 10 is mounted, the stationary object has a negative speed. The frequency threshold is set to be a higher frequency such that the reflected power from a roadside object or the like located in the vicinity and lateral side of the own vehicle is not mixed into the determination area. This is because a stationary object existing in the distance towards the rear side of the own vehicle is detected in a direction close to right behind the own vehicle, but a stationary object existing close to the own vehicle and in the lateral side thereof is detected in a lateral direction of the own vehicle. Moreover, peaks detected in the determination area are referred to determination peaks. The distance correlated to the frequency threshold thereof corresponds to a threshold distance.

A first feature quantity D1 is the total number of determination peaks on the two-dimensional spectrum.

A second feature quantity D2 is an average power of the determination peak on the two-dimensional spectrum.

A third feature quantity D3 is a power variance of the determination peak on the two-dimensional spectrum.

A fourth feature quantity is an average azimuth of the determination peak on the two-dimensional spectrum.

A fifth feature quantity is an azimuth variance of the determination peak on the two-dimensional spectrum.

A sixth feature quantity D6 is an average value (hereinafter referred to as the average number of incoming waves) of the number of the determination peaks which are separated on the two-dimensional spectrum from one determination peak by the azimuth development for respective determination peaks on the FFT spectrum.

A seventh feature quantity D7 is an average power of the determination peak on the FFT spectrum.

A eighth feature quantity D8 is a power variance of the determination peak on the FFT spectrum.

A ninth feature quantity D9 is a power ratio of the FFT spectrum relative to the noise floor (i.e. S/N ratio).

A tenth feature quantity D10 is a variance of the power ratio of the FFT spectrum relative to the noise floor.

For the azimuth of the determination peak used for the fourth feature quantity, an amount of difference with respect to a straight back direction of the own vehicle is used. However, as the fourth feature quantity D4, instead of using the difference with respect to the straight back direction, an azimuth of the determination peak may be used. Also, for the third feature quantity D3, the fifth feature quantity D5, the eighth feature quantity D8 and the tenth feature quantity D10, actually, the variance itself is not used, but a value in which the inverse of the variance is multiplied by a coefficient is used. Further, here, as a feature quantity extracted from the two-dimensional spectrum, the average power and the power variance of the determination peak are exemplified. However, similar to the ninth feature quantity D9 and the tenth feature quantity, instead of merely using the average power and the power variance, the power ratio relative to the noise floor and the power variance may be used, and a two-dimensional spectrum may be used instead of the determination peak. In the case where a spectrum is used as an object for calculating the power, the power ratio and the power variance, instead of using peak, power other than the peak is used which is different from the case of using the peak. According to the first feature quantity D1, the total number of determination peaks on the two-dimensional peak is used, but the total number of determination peaks on the FFT spectrum may be used.

Then, when the i-feature quantity Di is acquired, a distribution representing a probability of a case where the own vehicle is travelling in the specific environment is defined as a positive distribution and a distribution representing a probability of a case where the own vehicle is travelling in the non-specific environment is defined as a negative distribution. The positive distribution and the negative distribution are generated based on a learning data acquired in the following manner. In accordance with feature quantities collected in advance by running the mobile body, it determines whether the specific environment or the non-specific environment the feature quantities are acquired, an manually correlates the feature quantities with either the non-specific environment the feature quantities, the correlated data is defined as the learning data.

For the positive distribution, a plurality of i-feature quantities Di collected when travelling in the specific environment are used to generate the histogram and further normal distribution is acquired when the feature quantities show a normal distribution, thereby generating the positive distribution. Similarly, for the negative distribution, a plurality of i-feature quantities Di collected when travelling in the non-specific environment are used to generate the histogram and further, a normal distribution is acquired when the feature quantities are in accordance with a normal distribution, thereby generating the negative distribution. In other words, in the case where the positive distribution and the negative distribution are used to calculate the probability, if the feature quantities show a normal distribution, the probability is calculated using the normal distribution, and if the feature quantities do not show a normal distribution, the histogram is used to calculate the probability. FIGS. 6 to 11 exemplifies a histogram of the first feature quantity D1 to the tenth feature quantity D10. In particular, for the first feature quantity D1 and the second feature quantity D2, a normal distribution is even more exemplified.

A positive probability P (P) is a probability of a specific environment during travelling, and the negative probability is a probability of a non-specific environment during the travelling.

The positive distribution and the negative distribution generated for respective first feature quantity D1 to tenth feature quantity D10 and the positive probability P (P) and the negative probability P (N) are stored in a memory 72. In the memory 72, a memory region that stores the positive distribution and the negative distribution corresponds to distribution storing unit.

[1-3-3. Environment Determination Process]

Figure 12:
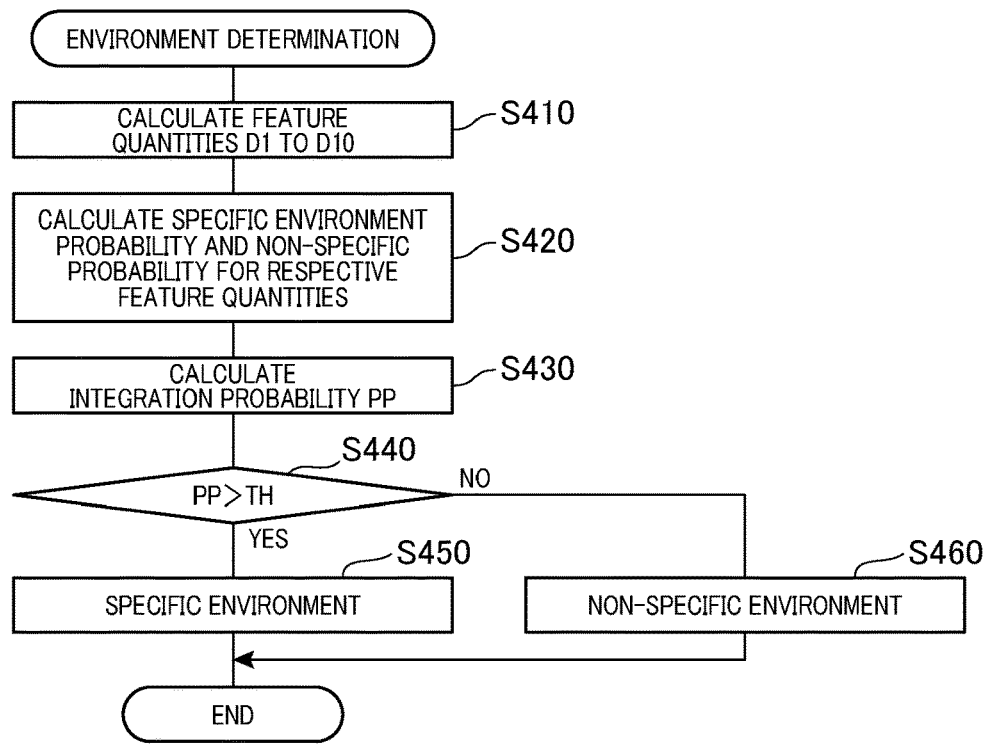
FIG. 12 is a flowchart showing an environment determination process according to a first embodiment.

An environment determination process executed by the processing unit 70 will be described with reference to a flowchart shown in FIG. 12.

At step S410, the processing unit 70 calculates the first feature quantity D1 to tenth feature quantity D10 based on the determination peak belonging to the determination area among the object peaks detected at step S170. For calculating the respective feature quantities, any one of FFT spectrums set in advance or a two-dimensional spectrum may be used, alternatively, a plurality of FFT spectrums or a two-dimensional spectrum may be used. When using the plurality of spectrums, the feature quantity may be calculated for each spectrum, or calculation value of the respective spectrums may be averaged as the feature quantity.

Next at step S420, the processing unit 70 calculates a specific environment probability P (Di|P) and non-specific environment probability P (Di|N) for each of the first feature quantity D1 to the tenth feature quantity D10. Specifically, the process reads a probability corresponding to the i-feature quantity Di calculated at step S410 from the positive distribution and the negative distribution stored in the memory 72.

Next at step S430, the processing unit 70 calculates an integration probability PP in accordance with equations (1) to (3). In these equations, a naive Bayes method is utilized in which Bayes estimation is applied assuming that the specific environment probability P (Di|P) and the non-specific environment probability P (Di|N) are independent events, to calculate a probability in which the environment where the own vehicle is travelling is a specific environment.

[Math 1]

$$PP = P(P) \times \frac{P(D|P)}{(P(D|P) + P(D|N))} \quad (1)$$

$$P(D|P) = \prod_i P(Di|P) \quad (2)$$

$$P(D|N) = \prod_i P(Di|N) \quad (3)$$

The equation (2) expresses a probability in which the specific environment probability P (Di|P) is synthesized for all feature quantities D1 to D10, and the equation (3) expresses a probability in which the non-specific environment probability P (Di|N) is synthesized for all feature quantities D1 to D10. Note that the equations (4) and (5) may be used instead of using the equations (2) and (3), whereby computation amount is reduced and cancellation of digit in the software is suppressed.

[Math 2]

$$P(D|P) = \exp(\log P(D|P)) \quad (4)$$

$$\log P(D|P) = \sum_i \log P(Di|P)$$

$$P(D|N) = \exp(\log P(D|N)) \quad (5)$$

$$\log P(D|N) = \sum_i \log P(Di|N)$$

At subsequent step S440, the processing unit 70 determines whether the integration probability PP calculated at step S430 is larger than or equal to a predetermined threshold TH. When the integration probability is larger than the threshold TH, the process proceeds to step S450, and when the integration probability PP is less than or equal to the threshold TH, the process proceeds to step S460. Note that the threshold TH is determined by experiment and the like such that a probability of the non-specific environment being erroneously determined to be the specific environment is made smaller as much as possible.

At step S450, the processing unit 70 determines an environment where the own vehicle is travelling to be the specific environment and terminates the environment determination process.

At step S460, the processing unit 70 determines an environment where the own vehicle is travelling to be the non-specific environment and terminates the environment determination process.

In the environment determination process, step S410 corresponds to feature quantity calculation unit and step S420 to S460 correspond to environment determination unit.

[1-3. Effects and Advantages]

According to the first embodiment described in detail, the following effects and advantages can be obtained.

(1a) The radar apparatus 10 extracts a plurality of feature quantities D1 to D10 from the FFT spectrum calculated based on the reception signals with a plurality of modulation systems and from the two-dimensional spectrum. Then, it is determined whether the own vehicle is in the specific environment by using the integration probability PP calculated for the respective feature quantities D1 to D10, which integrates the specific environment probability P (Di|P) and the non-specific environment probability P (Di|N). Hence, according to the radar apparatus 10, since the radar apparatus 10 can determine whether it is in the specific environment or not considering a plurality of elements expressed by the feature quantities D1 to D10, the accuracy of the determination can be improved. As a result, the ghost determination can be performed only in the specific environment, and the processing load of the radar apparatus 10 can be mitigated.

(1b) According to the radar apparatus 10, in the case where the specific environment probability P (Di|P) and the non-specific environment probability P (Di|N) are integrated, the naive Bayes method is utilized where respective events are assumed to occur independently. Hence, a feature quantity Di can be added or removed easily, and the accuracy for determining whether it is in the specific environment can be appropriately adjusted.

(1c) According to the radar apparatus 10, the threshold TH for evaluating the integration probability PP is set in order to suppress erroneous determination in which the non-specific environment is determined to be the specific-environment as much as possible. That is, when a process for removing the ghost is performed regardless of the non-specific environment, an object which actually exists may be erroneously determined as a ghost and a possible danger may not be detected, but such a situation can be suppressed with the above-described configuration. In other words, even if the specific environment is erroneously determined as the non-specific environment, the ghost is not removed, but only a miss alert based on the ghost is increased so that a danger still can be detected. Considering this situation, the threshold TH is set in the safer side.

Note that the threshold TH may be variably set depending on a travelling environment, odometry information such as travelling speed of the own vehicle and a steering angle.

2. Second Embodiment

[2-1. Difference between the Second Embodiment and the First Embodiment]

Since the second embodiment has a basic configuration which is the same as that of the first embodiment, difference points will be described in the following. Note that reference symbols that are the same as that of the first embodiment indicate the same configuration as the first embedment and the foregoing explanation should be applied.

According to the first embodiment, the integration probability PP is used to determine the specific environment. In contrast, the second embodiment differs from the first embodiment in that a log Bayes ratio is used. Specifically, a content of the environment determination process is partly different from the first embodiment.

[2-2 Process]

Figure 13:
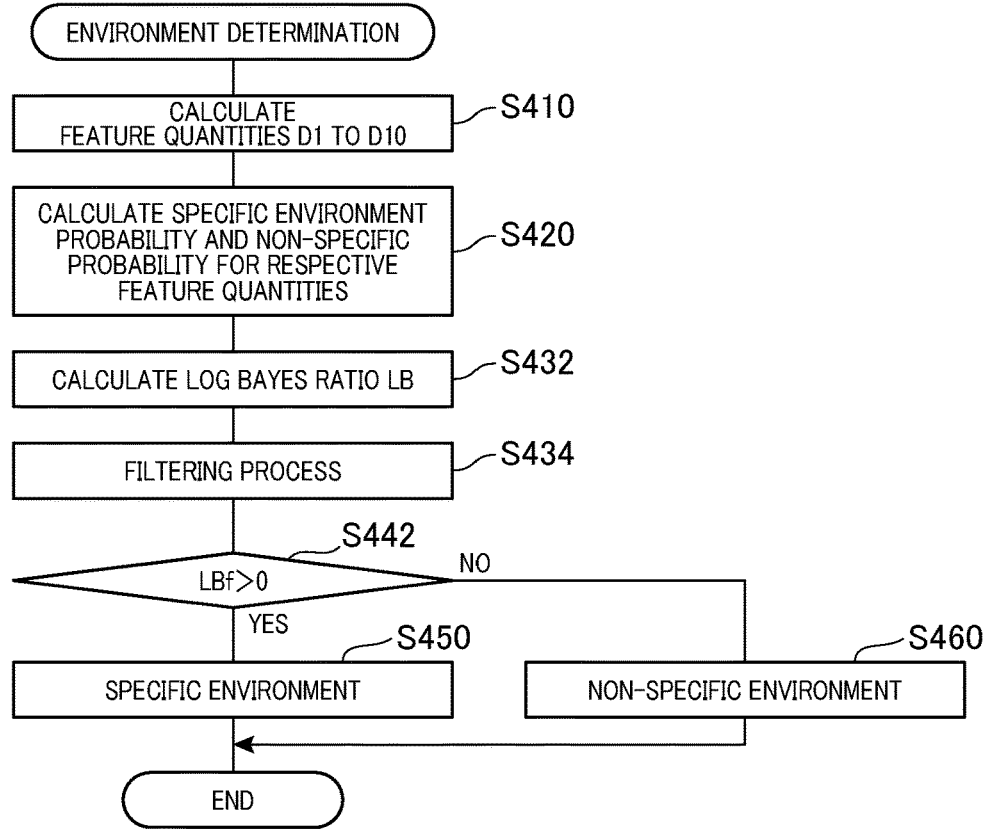
FIG. 13 is a flowchart showing an environment determination process according to a second embodiment.

With reference to a flowchart shown in FIG. 13, a virtual image determination process according to the second embodiment will be described. This process is executed by the processing unit 70 instead of executing the environment determination process of the first embodiment. Note that since processes of step S410 to S420 and S450 to S460 are the same as those in the first embodiment, explanation thereof will be omitted.

At step S432 subsequent to step S429, the processing unit 70 calculates the log Bayes ratio LB based on the equations (6) and (7). However, log P (Di|P) and log P (Di|N) are calculated using the above-described equations (4) and (5).

$$LB = TH + \log P(D|P) - \log P(D|N) \quad (6)$$

$$TH = \log P(P) - \log P(N) + A \quad (7)$$

A in the equation (7) is a constant determined by an experiment, which may be 0. TH is a threshold which is set such that the specific environment is determined when LB is positive value and the non-specific environment is determined when LB is negative value.

Next at step S434, the processing unit 70 executes a filtering process applied to the log Bayes ratio LB for suppressing a rapid change of the value. Note that the log Bayes ratio calculated at step S432 is expressed by LB [n], the log Bayes ratio after the filtering process is expressed by LBf [n], and the log Bayes ratio after the filtering process in the previous cycle is expressed by LBf [n−1]. The coefficient $\alpha$ is a real number, that is, $0 < \alpha \leq 1$. In the filtering process, calculation expressed in the equation (8) is executed. The log Bayes ratio after the filtering process LBf [n] is also simply expressed by LBf.

$$LBf[n] = \alpha \times LB[n] + (1-\alpha) LBf[n-1] \quad (8)$$

Next at step S442, the processing unit 70 determines whether the log Bayes ratio LBf is larger than 0. When the log Bayes ratio is larger than 0, the process determines that the environment during the travelling is in the specific environment and proceeds to step S450, and when the log Bayes ratio is 0 or smaller, the process determines that the environment during the travelling is the non-specific environment and proceeds to step S460.

[2-3. Operation Example]

Figure 14:
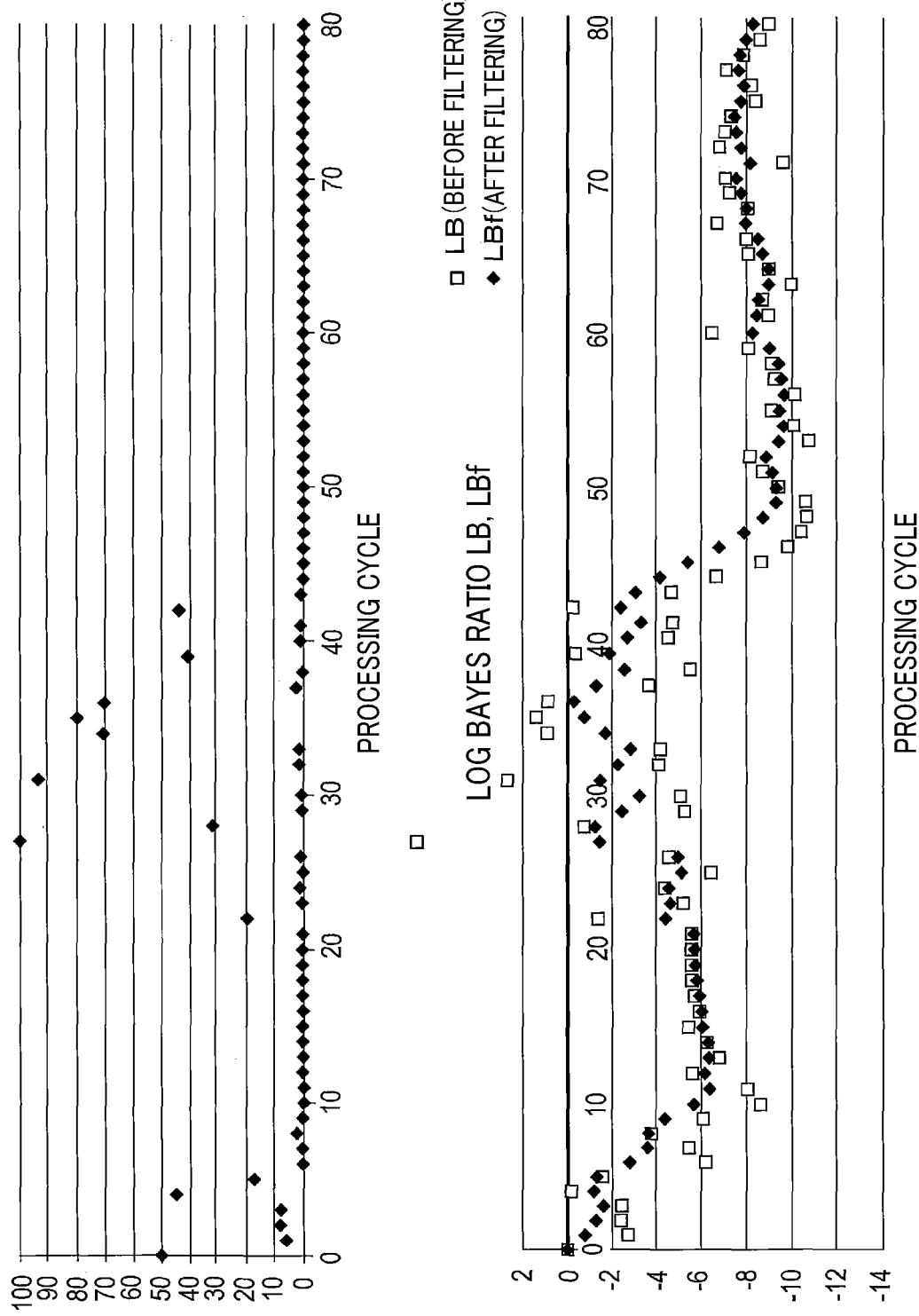
FIG. 14 is a graph in which an integration probability calculated when travelling in a non-specific environment and a log Bayes ratio before and after a filtering process are plotted at each processing cycle.
Figure 15:
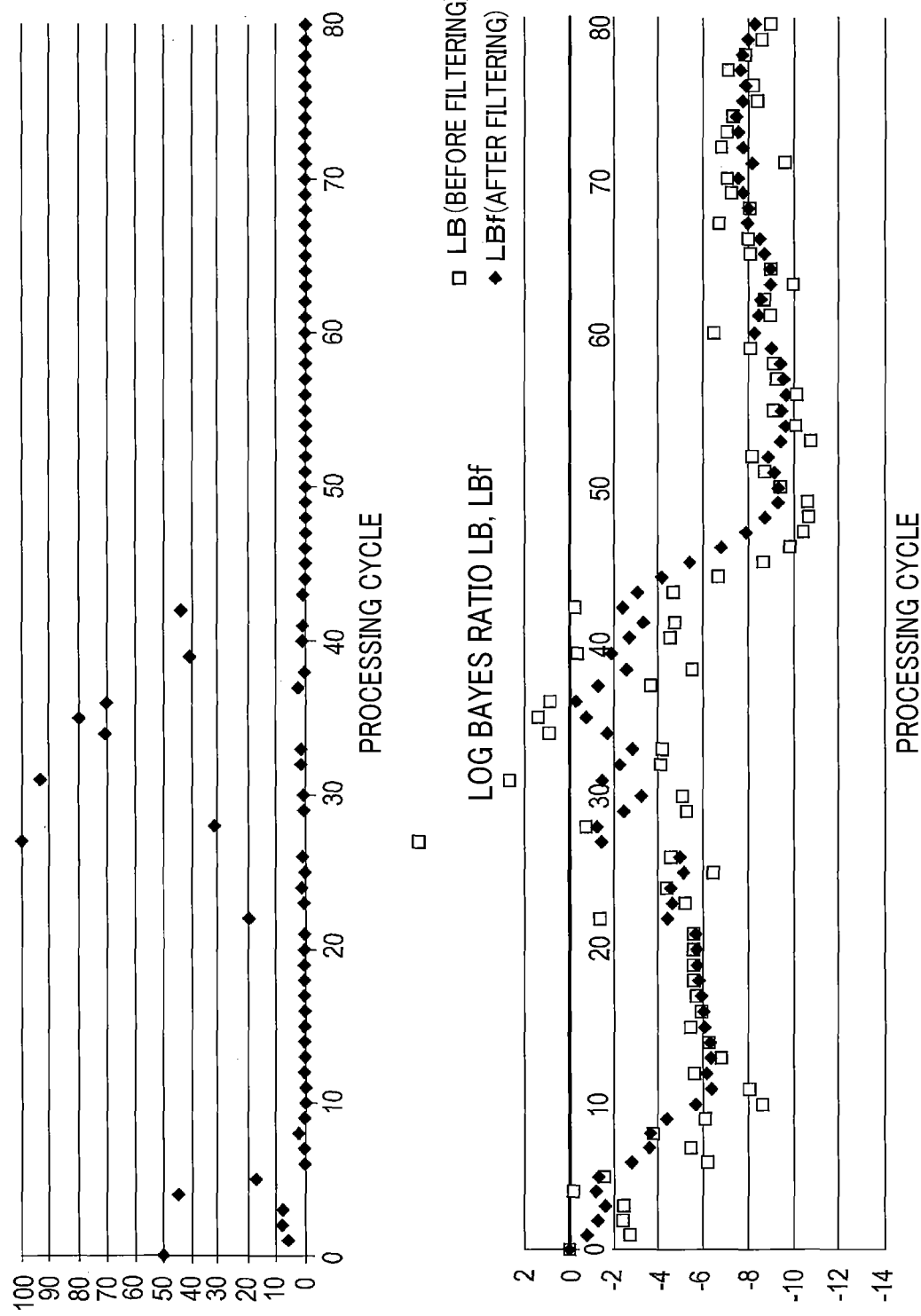
FIG. 15 is a graph in which an integration probability calculated when travelling in a specific environment and a log Bayes ratio before and after a filtering process are plotted at each processing cycle.

In FIGS. 14 and 15, each upper-side graph indicates a ghost probability PG calculated with the equation (4). Also, each lower-side graph indicates the log Bayes ratio LB before filtering process calculated with the equation (6), and the log Bayes ratio LBf after the filtering process calculated with equation (8), which are plotted at every processing cycle. Note that FIG. 14 shows a case where environment of the own vehicle during the travelling is the non-specific environment, and FIG. 15 shows a case where environment of the own vehicle during the travelling is the specific environment.

As shown in FIG. 14, in 25 th processing cycle, regardless of the non-specific environment due to external disturbance, the integration probability PP exceeds 50% and the log Bayes ratio LB becomes a positive value. When determining whether it is the specific environment using the integration probability PP or the log Bayes ratio LB before filtering process, the determination result may be wrong. However, since the log Bayes ratio LBf after the filtering is maintained at a negative value, a correct determination result can be obtained.

Note that the parameter A of the equation (7) is adjusted, whereby the threshold TH can be changed. For example, when setting A=0, a probability of the specific environment being erroneously determined to be non-specific environment and a probability of the non-specific environment being erroneously determined to be specific environment are the same.

For example, a case is considered where the on-vehicle system 1 is operated as a system generating an alert for an object approaching the own vehicle. In this case, compared to a determination in which the non-specific environment (e.g. ordinary road) is erroneously determined to be the specific environment (e.g. tunnel) causing wasteful system operation, a determination in which the specific environment is erroneously determined to be the non-specific environment, causing non-operation of the system, is problematic. That is, a case where an alert is not generated in a dangerous situation is more problematic than a case where an alert is generated in a non-dangerous situation.

For example, a case is considered where the on-vehicle system 1 detects and deletes a ghost (i.e. virtual image) in the object candidates, and generates an alert for the object approaching the own vehicle. In this case, when the system erroneously determines the non-specific environment to be the specific environment, causing wasteful operation, the system possibly deletes an object to be detected.

Accordingly, in order to suppress occurrence of these cases, the system may set A>0, that is, as shown in FIG. 14, by setting the threshold TH to be shifted towards the positive side, and a probability of erroneous determination of the non-specific environment to be the specific environment may be lowered. Further, depending on the process accomplished by the on-vehicle system 1, a condition A<0 is set and the threshold TH is shifted towards the negative side, whereby the probability of erroneous determination of the non-specific environment to be the specific environment may be lowered.

[2-4. Effects and Advantages]

According to the second embodiment described in detail, the effects and advantages (1a) to (1c) in the above-described first embedment and also the following effects and advantages can be obtained.

(2a) Log Bayes ratio LBf is calculated by a filtering process using a coefficient $\alpha$ to mix the log Bayes ratio LB [n] acquired in the current processing cycle and the log Bayes ratio LBf [n−1] acquired in the previous processing cycle. Hence, even if an abnormal log Bayes ratio LB is accidentally calculated due to an external disturbance, the determination of whether it is in the specific environment does not immediately cause a response. Hence, stable determination result can be obtained.

(2b) By using the log Bayes ratio LBf, the computation amount can be more reduced compared to the case where the integration probability PP is used.

(2c) The calculation of the log Bayes ratio LB uses the threshold TH, and the threshold TH can be adjusted easily.

3. Third Embodiment

[3-1. Difference between the Third Embodiment and the First Embodiment]

Since the third embodiment has a basic configuration which is the same as that of the first embodiment, difference points will be described in the following. Note that reference symbols same as that of the first embodiment indicate the same configuration as the first embedment and foregoing explanation is applied.

According to the first embodiment, for the determination of whether it is the specific environment, the positive distribution and the negative distribution stored in the memory 72 are used, and the values are constant. The third embodiment differs from the first embodiment in that the positive distribution and the negative distribution stored in the memory 72 are appropriately updated by a learning process. Specifically, a content of the object detecting process is partly different from the first embodiment.

Also, according to the present embodiment, the operation mode includes a learning mode that executes a learning process. Note that the memory 72 includes initial values of the positive distribution and the negative distribution stored therein.

[3-2. Object Detecting Process]

Figure 16:
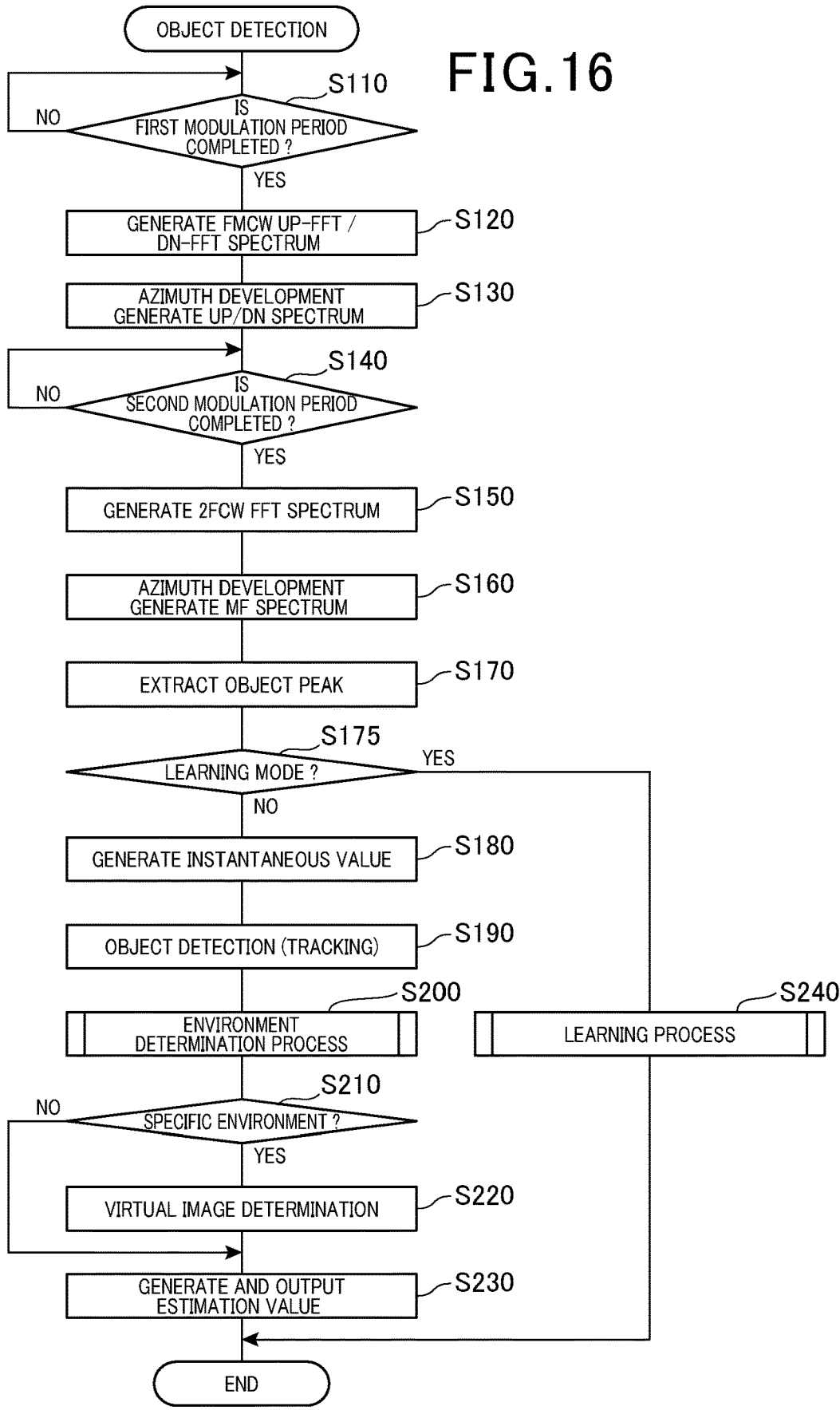
FIG. 16 is a flowchart showing an object detecting process according to a third embodiment.

With reference to a flowchart shown in FIG. 16, an object detection process of the third embodiment will be described. The object detection process of the third embodiment is executed by the processing unit 70 instead of executing the object detecting process of the first embodiment shown FIG. 3. According to the object detecting process of the present embodiment, since processes other than processes at steps S175 and S240 which are newly added in the third embodiment are the same as those in the first embodiment, only different configurations will be described.

At step S175 subsequent to step S170, the processing unit 70 determines whether the operation mode of the radar apparatus 10 is a learning mode. When the operation mode is the learning mode, the process proceeds to step S240 and otherwise the process proceeds to step S180. The operation mode is set by an input operation of an input device provided outside the processing unit 70.

At step S240, the processing unit 70 executes the learning process and terminates the process. Note that the learning process generates a probability distribution used for determining whether it is in the specific environment or not, and updates the probability distribution.

[3-3. Learning Process]

The learning process executed at step S250 by the processing unit will be described with reference to a flowchart shown in FIG. 17.

At step S310, the processing unit 70 calculates the first feature quantity D1 to the tenth feature quantity D10 based on the determination peak belonging to the determination area among the object peaks detected at step S170.

For the calculation of respective feature quantities, any one of FFT spectrums or a two-dimensional spectrum may be used, or a plurality of FFT spectrums or a two-dimensional spectrum may be used. When using the plurality of spectrums, feature quantity may be calculated for each spectrum, or an average of the calculation values of respective spectrums may be used as a feature quantity.

At step S320, the processing unit 70 stores the feature quantities calculated at step S310 into the memory 72 with teaching data correlated to the feature quantities. The teaching data indicates whether a travelling environment of the own vehicle is in the specific environment. The teaching data is set in the learning mode, for example, and a result of determination whether it is in the specific environment or the non-specific environment is successively stored into the processing unit by the passenger of the vehicle to set the teaching data. Also, in the case where a system includes an apparatus capable of determining what kind of environment the vehicle is travelling in based on a navigation system, a camera and a satellite positioning system (e.g. GPS) and the like (e.g. a case of vehicle dedicated for collecting data), the teaching data can be acquired from these apparatus. The feature quantities correlated to the teaching data (hereinafter referred to as feature quantity with teaching data) are stored, as shown in FIGS. 6 to 11, for each feature quantity and each teaching data (i.e. whether it is specific environment or not).

At subsequent step S330, the processing unit 70 determines whether it is an update timing, and when it is update timing, the process proceeds to step S340, and otherwise the process is terminated. The update timing may be a timing ensuring that the feature quantity with teaching data accumulated by the process at step S320 in the memory 72 reaches the number of quantities required for updating the positive distribution and the negative distribution.

At step S340, the processing unit 70 generates the positive distribution and the negative distribution based on the accumulated feature quantity with the teaching data and generates the positive probability P (P) and the negative probability P (N). Specifically, the distribution of the feature quantity shown in the histogram in FIGS. 6 to 11 is expressed by a normal distribution, thereby producing the positive distribution and the negative distribution shown in FIG. 6 and FIG. 7. For the histograms shown in FIG. 8 to FIG. 11, although illustration in omitted, the positive distribution and the negative distribution are produced similarly. The positive probability P (P) and the negative probability P (N) are calculated using a sum of the number of feature quantities collected under the specific environment and the number of feature quantities collected under the non-specific environment. Note that the positive probability P (P) and the negative probability P (N) may be a fixing value.

Next at step S350, the processing unit 70 updates the positive distribution and the negative distribution stored in the memory 72 based on the positive distribution and the negative distribution generated at step S340, and terminates the process.

As shown in FIGS. 6 to 11, for the first feature quantity D1, the fourth feature quantity D4 to the sixth feature quantity D6, the eighth feature quantity D8 and the tenth feature quantity D10, values in the specific environment tend to be smaller than those in the non-specific environment. Also, for the second feature quantity D2, the seventh feature quantity D7 and the ninth feature quantity D9, values in the specific environment tend to be larger than those in the non-specific environment.

Figure 8:
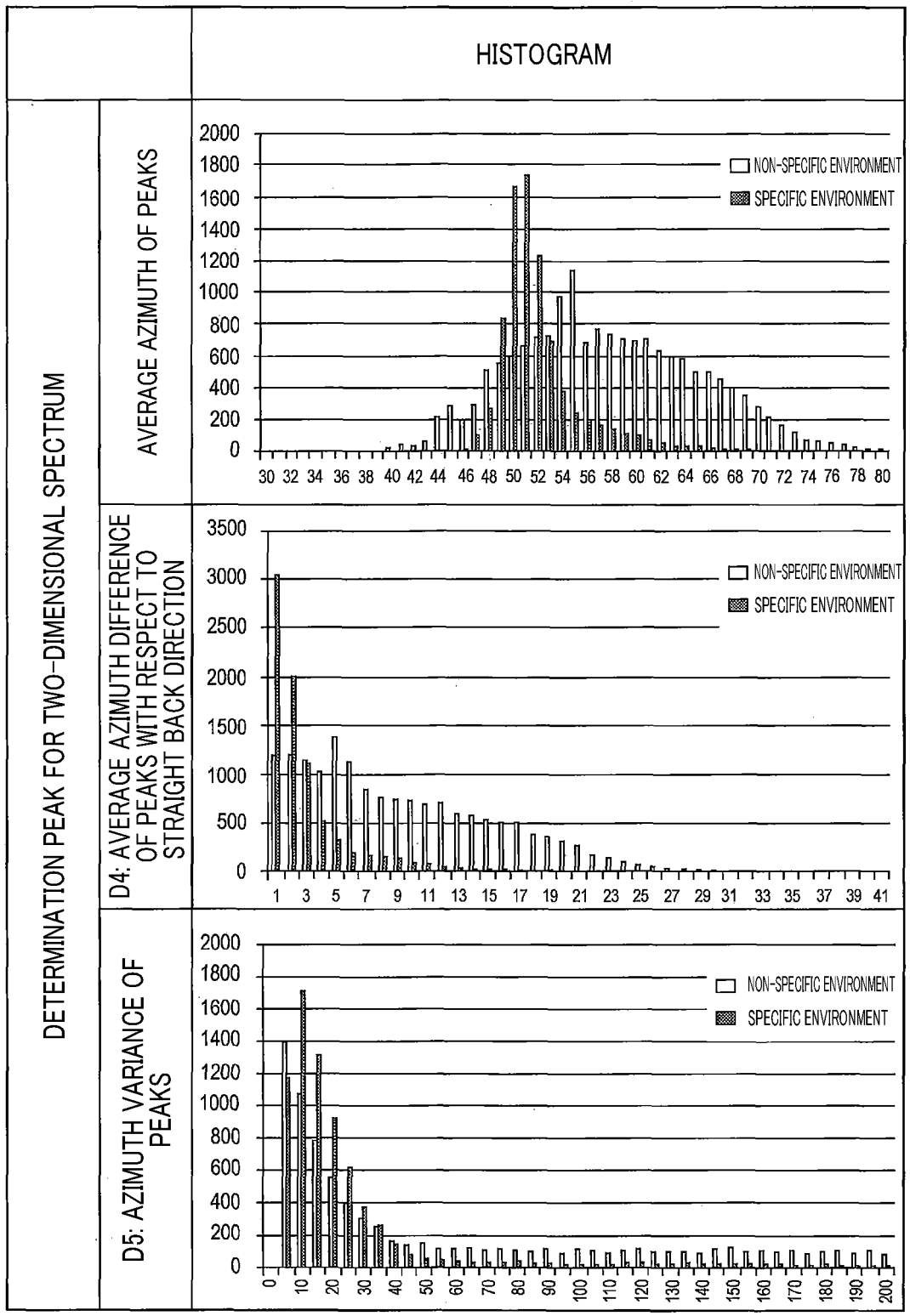
FIG. 8 a diagram showing a histogram of a feature quantity of a fourth feature quantity and a fifth feature quantity and a feature quantity similar to the fourth feature quantity.
Figure 9:
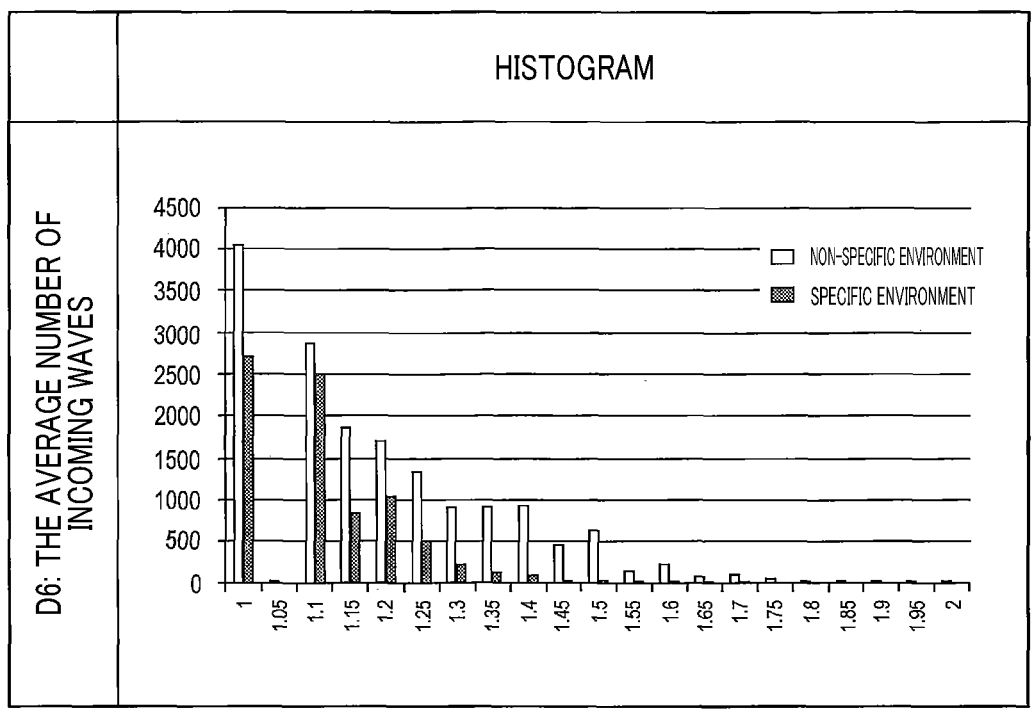
FIG. 9 is a diagram showing a histogram of a sixth feature quantity.
Figure 10:
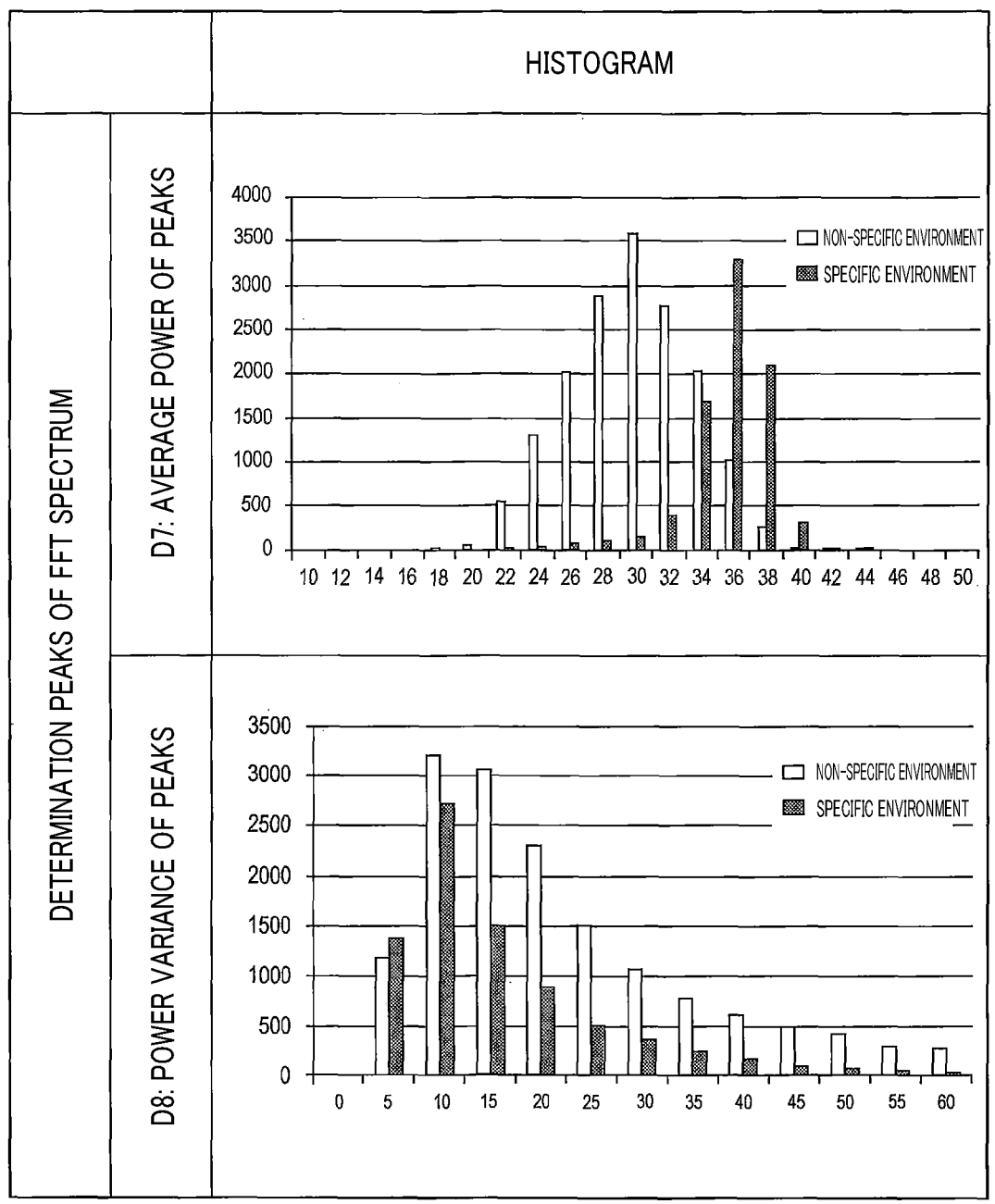
FIG. 10 is a diagram showing a histogram of a seventh feature quantity and an eighth feature quantity.
Figure 11:
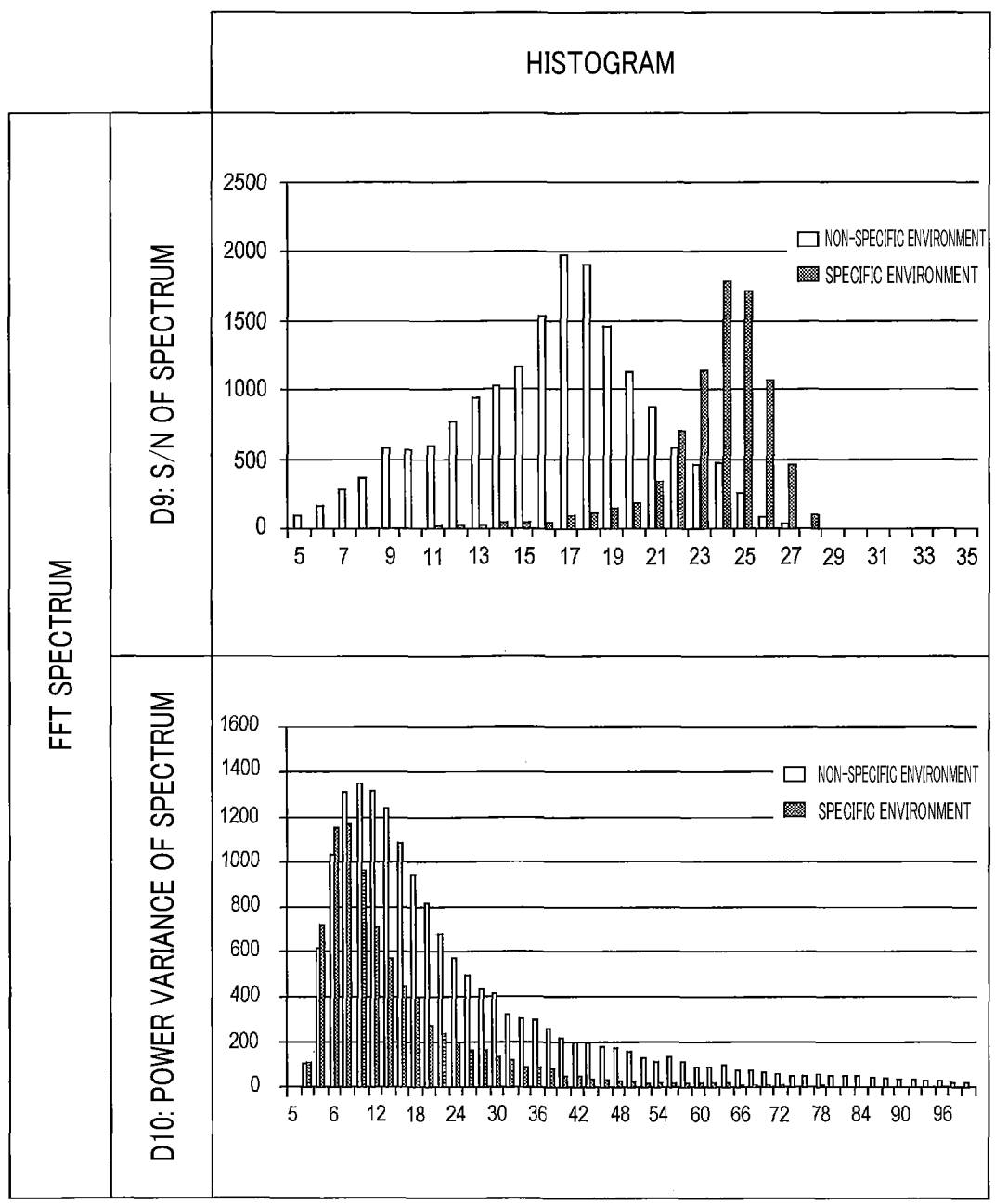
FIG. 11 is a diagram showing a ninth feature quantity and a tenth feature quantity.

As shown in FIG. 8, as the fourth feature quantity D4, an average of azimuth difference with respect to a back side direction is used. However, instead of the fourth feature quantity, or in addition to the first to eighth feature quantity D1 to D8, an average azimuth of the peak may be used.

In the learning process, step S310 corresponds to feature quantity calculation unit, step S320 corresponds to collecting unit and steps S330 to S350 correspond to learning unit.

[3-4. Effects and Advantages]

According to the third embodiment described in detail, the effects and advantages (1a) to (1c) in the above-described first embedment and also the following effects and advantages can be obtained.

(3a) By using the learning mode, the positive distribution and the negative distribution stored in the memory 72 can be updated. Hence, an accuracy of determining whether it is in the specific environment or not can be continuously improved.

4. Other Embodiments

Embodiments of the present disclosure is described so far. The present disclosure is not limited to the above-described embodiments, but may be modified in various manners.

(4a) According to the above-described embodiments, the environment determination process is performed using the first to tenth feature quantity D1 to D10, but the present disclosure is not limited thereto. For example, the environment determination process may be configured to determine whether it is in the specific environment using a combination of the information around the own vehicle acquired from the image of the on-vehicle camera, information acquired from the positional information and the map information of the own vehicle.

(4b) According to the above-described embodiments, the first to tenth feature quantity D1 to D10 are used for feature quantities used for calculating the log Bayes ratio LB, but feature quantities may be used in which a clear difference is present between the positive distribution and the negative distribution. For the number of feature quantities used for calculating the integration probability PP, it is not limited to 10 but 1 to 9, or more than or equal to 11 feature quantities may be used.

(4c) In the above-described embodiments, when calculating the log probability such as log P (Di|P) and log P (Di|N), the calculated value is likely to be extremely small. However, an integration virtual image probability PG, which is finally calculated, is acquired with these ratios. Accordingly, a maximum value is defined as MAX in the log P (Di|P) and log P (Di|N), and values where the maximum value MAX is subtracted from respective values may be used as a log probability.

(4d) In the above-described embodiments, the radar apparatus 10 is disposed such that a detection range of the radar apparatus 10 includes a back side area along the linear advancing direction of the vehicle. However, the present disclosure is not limited to this. For example, the radar apparatus 10 may be disposed such that a detection range of the radar apparatus 10 includes a front side area along the linear advancing direction of the vehicle. In this case, for example, the azimuth used for the feature quantity may be calculated as an azimuth difference of the front forward direction with respect to a reference direction.

(4d) The processing unit 70 and method thereof disclosed in the present disclosure may be accomplished by a dedicated computer constituted of a processor and a memory programmed to execute one or more functions embodied by computer programs. Alternatively, the processing unit 70 and method thereof disclosed in the present disclosure may be accomplished by a dedicated computer provided by a processor configured of one or more dedicated hardware logic circuits. Further, the processing unit 70 and method thereof disclosed in the present disclosure may be accomplished by one or more dedicated computer where a processor and a memory programmed to execute one or more functions, and a processor configured of one or more hardware logic circuits are combined. Furthermore, the computer programs may be stored, as instruction codes executed by the computer, into a computer readable non-transitory tangible recording media. The method that accomplishes functions of respective units included in the processing unit 70 is not necessarily accomplished using software, but all of the functions may be accomplished by one or more hardware units.

(4e) Multiple functions of a single component in the above-described embodiment may be implemented by multiple components, and a single function of a single component may be implemented by multiple components. Moreover, multiple functions of multiple components may be implemented by a single component, and a single function implemented by multiple components may be implemented by a single component. Further, some of the configurations of the above-described embodiment may be omitted. In addition, at least some of the configurations of the above-described embodiment may be added to or replaced with the configurations of the other embodiments described above.

(4f) The present disclosure can be embodied in various modes in addition to the above-described radar apparatus 10, such as a system including the radar apparatus 10 as a constituent, a program functioning the computer as the radar apparatus 10, a non-transitory tangible recoding media such as a semiconductor memory device storing this program and an environment determination method.

CONCLUSION

According to one aspect of the present disclosure, in a radar apparatus mounted to a mobile body, a technique is provided to improve a determination accuracy whether the mobile body is in a specific environment.

One aspect of the present disclosure is a radar apparatus mounted to a mobile body and provided with a spectrum generation unit, a peak extracting unit, a feature quantity calculation unit, a distribution storing unit and an environment determination unit.

The spectrum generation unit uses one or more modulation systems, analyzes a signal acquired by transmitting and receiving modulation waves of respective modulation systems as radar waves so as to generate at least one of an one-dimensional spectrum and a two dimensional spectrum. The peak extracting unit extracts a peak from the at least one of the one-dimensional spectrum and the two dimensional spectrum generated for the respective modulation systems. The feature quantity calculation unit calculates one or more predetermined types of feature quantities using information correlated to respective peaks extracted by the peak extracting unit. In the distribution storing unit, a positive distribution and a negative distribution generated in advance for respective feature quantities are stored in which the positive distribution expresses, with the feature quantities being given, a probability an environment when acquiring the feature quantity being a specific environment set in advance, the negative distribution expresses, with the feature quantities being given, a probability of an environment when acquiring the feature quantity being a non-specific environment other than the specific environment set in advance. The environment determination unit calculates a specific environment probability from a calculation result of the feature quantity calculation unit using the positive distribution and a non-specific environment probability from a calculation result of the feature quantity calculation unit using the negative distribution, and determines whether the mobile body is in the specific environment or the non-specific environment in accordance with a result of integration of the specific environment probability and the non-specific environment probability which are calculated for respective feature quantities. Note that the feature quantities show distribution shapes which are different between a case when calculated corresponding to the specific environment and a case when calculated corresponding to the non-specific environment.

According to such a configuration, since the determination whether it is in the specific environment can be performed combining a plurality of feature quantities, the determination accuracy can be improved. Note that physical quantities corresponding to coordinate axes of the one-dimensional spectrum and the two-dimensional spectrum are different depending on the modulation system. The coordinate axes of the one-dimensional spectrum correspond to, for example, a relative speed for a case of 2FCW, and correspond to a distance and a relative speed. Also, for example, the coordinate axes of the two-dimensional spectrum correspond to the relative speed and the azimuth in the 2FCW, the distance and the relative speed in the FMCW, and the distance and the relative speed in the FCM. Note that FMCW is an abbreviation of Frequency Modulated Continuous Wave, CW is an abbreviation of Continuous Wave and FCM is an abbreviation of Fast-Chirp Modulation. 2F of 2FCW refers to two frequencies.

What is claimed is:

1. A radar apparatus mounted on a mobile body comprising:
    a spectrum generation unit configured to use one or more modulation types, and analyze a signal acquired by transmitting and receiving modulation waves of respective modulation types as radar waves so as to generate at least one of a one-dimensional spectrum and a two-dimensional spectrum;
    a peak extracting unit configured to extract a peak from at least one of the one-dimensional spectrum and the two-dimensional spectrum generated for the respective modulation types;
    a feature quantity calculation unit configured to calculate one or more predetermined types of feature quantities using information correlated to respective peaks extracted by the peak extracting unit;
    a distribution storing unit that stores a positive distribution and a negative distribution generated in advance for respective feature quantities, the positive distribution expressing, for the feature quantities given, a probability of an environment when acquiring the feature quantity being a specific environment set in advance, the negative distribution expressing, for the feature quantities given, a probability of an environment when acquiring the feature quantity being a non-specific environment other than the specific environment set in advance; and
    an environment determination unit configured to calculate a specific environment probability from a calculation result of the feature quantity calculation unit using the positive distribution and a non-specific environment probability from a calculation result of the feature quantity calculation unit using the negative distribution, and determine whether the mobile body is in the specific environment or the non-specific environment in accordance with a result of integration of the specific environment probability and the non-specific environment probability, which are calculated for respective feature quantities,
    wherein
    the feature quantities show distribution shapes, which are different between a case when calculated corresponding to the specific environment and a case when calculated corresponding to the non-specific environment.

2. The radar apparatus according to claim 1, wherein the feature quantity calculation unit calculates an average azimuth of peaks extracted by the peak extracting unit to be one of the feature quantities.

3. The radar apparatus according to claim 1, wherein the feature quantity calculation unit calculates a variance of the peaks extracted by the peak extracting unit to be one of the feature quantities.

4. The radar apparatus according to claim 2, wherein the feature quantity calculation unit uses an azimuth difference with respect to a predetermined reference direction.

5. The radar apparatus according to claim 1, wherein the feature quantity calculation unit calculates at least one of an average power of a plurality of peaks extracted by the peak extracting unit, an average power ratio of the plurality of peaks relative to a noise floor, a variance of power of the plurality of peaks and a variance of a power ratio of the plurality of peaks relative to a noise floor, to be one of the feature quantities.

6. The radar apparatus according to claim 1, wherein the feature quantity calculation unit calculates a total number of peaks extracted by the peak extracting unit to be one of the feature quantities.

7. The radar apparatus according to claim 1, wherein the spectrum generation unit is configured to execute a Fast Fourier Transform (FFT) process applied for a signal acquired by at least one of the modulation types to generate an FFT spectrum as the one-dimensional spectrum, perform an azimuth development of the FFT spectrum for each frequency bin, thereby generating the two-dimensional spectrum.

8. The radar apparatus according to claim 7, wherein the feature quantity calculation unit calculates at least one of an average power of a plurality of peaks detected on the FFT spectrum, a power ratio of the plurality of peaks relative to a noise floor, a variance of power of the plurality of peaks and a variance of a power of the plurality of peaks relative to a noise floor, to be one of the feature quantities.

9. The radar apparatus according to claim 7, wherein the feature quantity calculation unit calculates at least one of an average power of the FFT spectrum, a power ratio of the FFT spectrum relative to a noise floor, a variance of power of the FFT spectrum and a variance of a power of the FFT spectrum relative to a noise floor, to be one of the feature quantities.

10. The radar apparatus according to claim 7, wherein the feature quantity calculation unit calculates a total number of peaks extracted on the FFT spectrum to be one of the feature quantities.

11. The radar apparatus according to claim 8, wherein the feature quantity calculation unit calculates, when performing an azimuth development for peaks on the FFT spectrum, an average value of the number of peaks, which are separated on the two-dimensional spectrum from one peak on the FFT spectrum.

12. The radar apparatus according to claim 1, wherein the feature quantity calculation unit calculates the feature quantity by using a peak detected with a distance larger than or equal to a threshold distance set depending on a mobile speed of the mobile body.

13. The radar apparatus according to claim 1, wherein the modulation types include at least Frequency Modulated Continuous Wave (FMCW) modulation; and
    the spectrum generation unit generates the one-dimensional spectrum and the two-dimensional spectrum for at least one of an up-chirp and a down-chirp in the FMCW modulation, both the up-chirp and the down-chirp in the FMCW modulation being one of the modulation types.

14. The radar apparatus according to claim 1, wherein the modulation types include at least a multiple frequency of Continuous Wave (CW) modulation or a Fast-Chirp Modulation (FCM).

15. The radar apparatus according to claim 1 further comprising:
   a collecting unit that collects the feature quantities calculated by the feature quantity calculation unit as being correlated to a teaching data indicating whether an environment when the feature quantities are acquired is the specific environment or the non-specific environment; and
   a learning unit that generates the positive distribution and the negative distribution using the feature quantities collected by the collecting unit and updates a storage content of the distribution storing unit in accordance with a predetermined update timing.

\* \* \* \* \*